United States Patent [19]

Aragaki

[11] Patent Number: 5,187,755
[45] Date of Patent: Feb. 16, 1993

[54] METHOD OF AND APPARATUS FOR COMPRESSING IMAGE DATA

[75] Inventor: Masami Aragaki, Kyoto, Japan

[73] Assignee: Dainippon Screen Mfg. Co., Ltd., Kyoto, Japan

[21] Appl. No.: 369,423

[22] Filed: Jun. 21, 1989

[30] Foreign Application Priority Data

Jun. 30, 1988 [JP] Japan .................. 63-165361
Dec. 19, 1988 [JP] Japan .................. 63-321803

[51] Int. Cl.5 .................................. G06K 9/36
[52] U.S. Cl. ............................... 382/56; 382/43; 358/133; 358/432; 358/433
[58] Field of Search ............... 382/39, 42, 43, 56; 358/133, 135, 136, 432, 433

[56] References Cited

U.S. PATENT DOCUMENTS

| | | | |
|---|---|---|---|
| 4,760,461 | 7/1988 | Sato ...................... | 358/432 |
| 4,792,851 | 12/1988 | Mochizuki ............. | 358/133 |
| 4,910,609 | 3/1990 | Nicholas et al. ....... | 382/56 |
| 4,918,541 | 4/1990 | Ishida et al. ........... | 382/56 |
| 4,922,273 | 5/1990 | Yonekawa et al. .... | 382/56 |
| 4,947,447 | 8/1990 | Miyaoka et al. ....... | 358/433 |

OTHER PUBLICATIONS

IEEE International Conference on Acoustics, Speech and Signal Processing, by Zhang et al., entitled "A New Adaptive Classified Transform Coding Method", 1989, vol. 3, pp. 1835–1837.

The Image Coding publication by Kummerfeldt et al., entitled "Coding Television Signals at 320 and 64 kbit/s", vol. 594, 1985 pp. 119–128.

*Primary Examiner*—Jose Couso
*Attorney, Agent, or Firm*—Lowe, Price, LeBlanc & Becker

[57] ABSTRACT

Image data ($f_{ij}$) depicting an image in a pixel block are converted by 2-D Discrete Cosine Transformation into transformation coefficients ($F_{mn}$ or $F_{mn}^*$). Only a part of the coefficients are employed to form compressed image data ($D_t$). The selection of the part of the coefficients is executed using code tables (CT). Several groups of code tables are prepared, and one of those groups is selected in the data compression operation in response to a standard deviation ($\sigma$) of the image data in the pixel block. When the compressed image data is restored, identification data specifying the selected group in the previous data compression is stored in the restored image data. Then, in the next data compression of the restored image data, the selected group is again selected as a function of the identification data.

17 Claims, 20 Drawing Sheets

| i \ j | 0 | 1 | 2 | 3 | 4 | 5 | 6 | 7 |
|---|---|---|---|---|---|---|---|---|
| 0 | 63 | 64 | 59 | 105 | 140 | 26 | 96 | 114 |
| 1 | 67 | 48 | 64 | 132 | 96 | 63 | 64 | 44 |
| 2 | 69 | 50 | 30 | 132 | 44 | 98 | 30 | 3 |
| 3 | 65 | 51 | 41 | 40 | 36 | 83 | 31 | 19 |
| 4 | 68 | 57 | 46 | 40 | 49 | 177 | 73 | 79 |
| 5 | 63 | 59 | 53 | 43 | 33 | 44 | 11 | 103 |
| 6 | 60 | 61 | 52 | 47 | 44 | 41 | 29 | 160 |
| 7 | 61 | 57 | 47 | 48 | 50 | 44 | 31 | 40 |

| m \ n | 0 | 1 | 2 | 3 | 4 | 5 | 6 | 7 |
|---|---|---|---|---|---|---|---|---|
| 0 | 61 | −1 | −1 | 2 | 8 | −1 | 4 | −9 |
| 1 | 10 | 1 | −21 | 5 | 5 | 12 | −13 | 2 |
| 2 | 5 | 0 | −1 | −16 | 16 | −1 | −14 | 14 |
| 3 | 9 | −14 | 13 | −10 | 5 | −11 | 1 | 8 |
| 4 | 1 | −4 | 0 | 11 | −9 | −2 | −1 | 7 |
| 5 | −3 | 0 | 9 | −9 | 7 | −5 | −2 | 3 |
| 6 | −4 | 7 | −3 | 0 | 1 | 2 | −3 | −2 |
| 7 | 8 | −9 | 0 | 5 | −2 | 0 | 2 | −8 |

| | 0 | 1 | 2 | 3 | 4 | 5 | 6 | 7 |
|---|---|---|---|---|---|---|---|---|
| 0 | 215 | 255 | 121 | 0 | 25 | 31 | 30 | 26 |
| 1 | 219 | 255 | 106 | 0 | 26 | 25 | 26 | 26 |
| 2 | 231 | 255 | 108 | 0 | 24 | 24 | 26 | 26 |
| 3 | 234 | 255 | 97 | 0 | 23 | 27 | 28 | 26 |
| 4 | 224 | 255 | 92 | 0 | 26 | 26 | 26 | 25 |
| 5 | 220 | 255 | 85 | 0 | 30 | 29 | 24 | 21 |
| 6 | 221 | 255 | 78 | 0 | 26 | 30 | 30 | 23 |
| 7 | 230 | 255 | 77 | 0 | 28 | 30 | 30 | 30 |

| | 0 | 1 | 2 | 3 | 4 | 5 | 6 | 7 |
|---|---|---|---|---|---|---|---|---|
| 0 | 85 | 104 | 66 | 17 | −23 | −30 | −15 | −1 |
| 1 | 1 | 2 | −1 | −6 | −3 | 1 | 4 | 3 |
| 2 | 0 | −1 | 0 | 0 | −1 | 0 | 0 | 0 |
| 3 | 0 | 0 | −2 | 0 | −1 | −1 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

FIG.4

|  | 0 | 1 | 2 | 3 | 4 | 5 | 6 | 7 |
|---|---|---|---|---|---|---|---|---|
| 0 | — | $I_{01}$ | $I_{02}$ | $I_{03}$ | $I_{04}$ | — | — | — |
| 1 | $I_{10}$ | $I_{11}$ | — | $I_{13}$ | — | — | — | — |
| 2 | — | $I_{21}$ | — | $I_{23}$ | — | — | — | — |
| 3 | — | — | — | — | — | — | — | — |
| 4 | — | — | — | — | — | — | — | — |
| 5 | — | — | — | — | — | — | — | — |
| 6 | — | — | — | — | — | — | — | — |
| 7 | — | — | — | — | — | — | — | — |

CT → (origin), $I_{mn}$, n (horizontal axis), m (vertical axis)

FIG. 13
(EXAMPLE 1)
$\sigma_1 = 4.0$, $5.0 < \sigma_2$, $\sigma_3$

| FIG. 13(a) | FIG. 13(b) |
| FIG. 13(d) | FIG. 13(c) |
| FIG. 13(f) | FIG. 13(e) |
| FIG. 13(h) | FIG. 13(g) |

FIG. 15
(EXAMPLE 2)
$\sigma_1 = 4.0$, $5.0 < \sigma_2$, $\sigma_3$

| FIG. 15(a) | FIG. 15(b) |
| FIG. 15(d) | FIG. 15(c) |
| FIG. 15(f) | FIG. 15(e) |
| FIG. 15(h) | FIG. 15(g) |

FIG. 16
(EXAMPLE 3)
$\sigma_1 = 4.0$, $5.0 < \sigma_2$, $\sigma_3$

| FIG. 16(a) | FIG. 16(b) |
| FIG. 16(d) | FIG. 16(c) |
| FIG. 16(f) | FIG. 16(e) |
| FIG. 16(h) | FIG. 16(g) |

FIG. 13(a)

$f_{ij}(0)$  
$\sigma = 4.862$

| j\i | 0 | 1 | 2 | 3 | 4 | 5 | 6 | 7 |
|---|---|---|---|---|---|---|---|---|
| 0 | 99 | 103 | 103 | 107 | 105 | 94 | 93 | 91 |
| 1 | 101 | 100 | 106 | 108 | 101 | 92 | 90 | 102 |
| 2 | 106 | 103 | 109 | 103 | 95 | 100 | 94 | 95 |
| 3 | 96 | 97 | 97 | 102 | 101 | 100 | 97 | 94 |
| 4 | 102 | 111 | 103 | 100 | 104 | 105 | 100 | 96 |
| 5 | 98 | 99 | 101 | 107 | 111 | 104 | 94 | 93 |
| 6 | 105 | 104 | 105 | 104 | 108 | 103 | 103 | 99 |
| 7 | 102 | 103 | 104 | 104 | 104 | 100 | 98 | 95 |

DCT ⇒

| n\m | 0 | 1 | 2 | 3 | 4 | 5 | 6 | 7 |
|---|---|---|---|---|---|---|---|---|
| 0 | 101 | 3 | 0 | 0 | 0 | 0 | 0 | 0 |
| 1 | -1 | -1 | -2 | -2 | -1 | 0 | 0 | 0 |
| 2 | 0 | 0 | 0 | -1 | -1 | 0 | -1 | 0 |
| 3 | 0 | 0 | 0 | 0 | 0 | 0 | 0 | 0 |
| 4 | 0 | 0 | -1 | -1 | -1 | 0 | -1 | 0 |
| 5 | 0 | 0 | 0 | 0 | 0 | 0 | 0 | 0 |
| 6 | 1 | 0 | 0 | 0 | 0 | 0 | 0 | 0 |
| 7 | 0 | 0 | 0 | 0 | -2 | 0 | 0 | 0 |

COMPRESSION ⇒

| n\m | 0 | 1 | 2 | 3 | 4 | 5 | 6 | 7 |
|---|---|---|---|---|---|---|---|---|
| 0 | 101 | 3 | 0 | 0 | 0 | 0 | 0 | 0 |
| 1 | -1 | 0 | -2 | -2 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

IDCT ⇓

FIG. 13(d)

$f_{ij}(1)$  
$\sigma = 3.621$  
$N_g = 01$

| j\i | 0 | 1 | 2 | 3 | 4 | 5 | 6 | 7 |
|---|---|---|---|---|---|---|---|---|
| 0 | 100 | 101 | 104 | 105 | 101 | 94 | 93 | 95 |
| 1 | 100 | 101 | 104 | 105 | 101 | 95 | 93 | 95 |
| 2 | 101 | 102 | 104 | 105 | 102 | 97 | 94 | 95 |
| 3 | 101 | 102 | 104 | 104 | 103 | 99 | 96 | 96 |
| 4 | 101 | 103 | 103 | 104 | 104 | 101 | 97 | 96 |
| 5 | 102 | 103 | 103 | 104 | 105 | 103 | 98 | 96 |
| 6 | 102 | 103 | 103 | 104 | 106 | 104 | 99 | 96 |
| 7 | 102 | 103 | 103 | 106 | 105 | 105 | 100 | 96 |

DCT + COMPRESSION ⇗

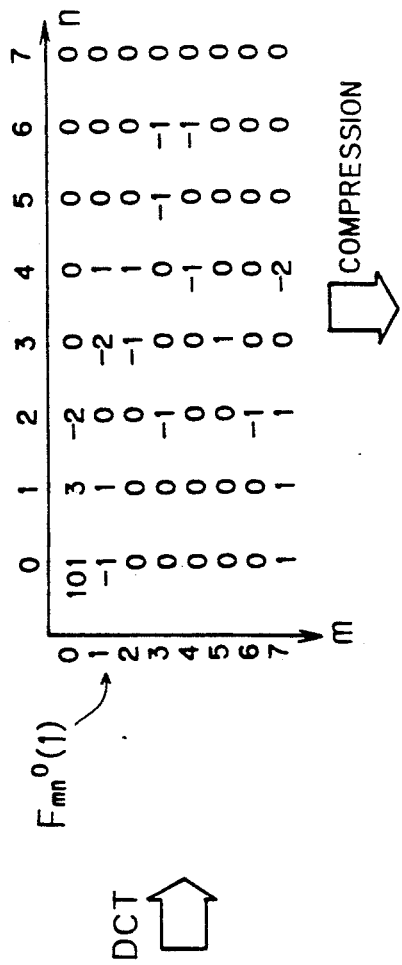
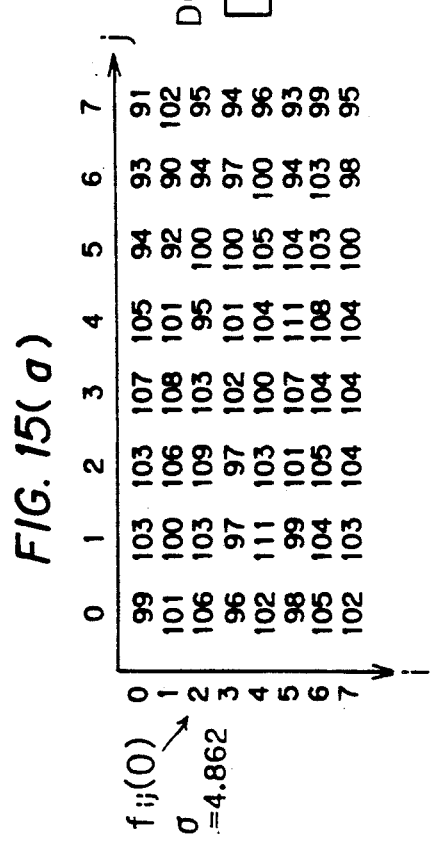
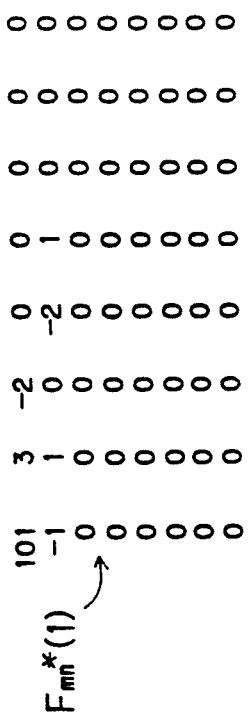
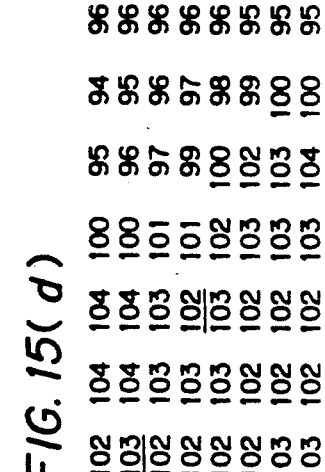
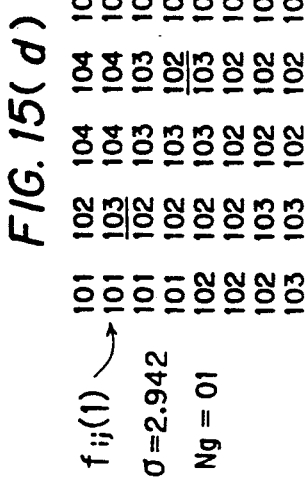
FIG. 15(a), FIG. 15(b), FIG. 15(c), FIG. 15(d)

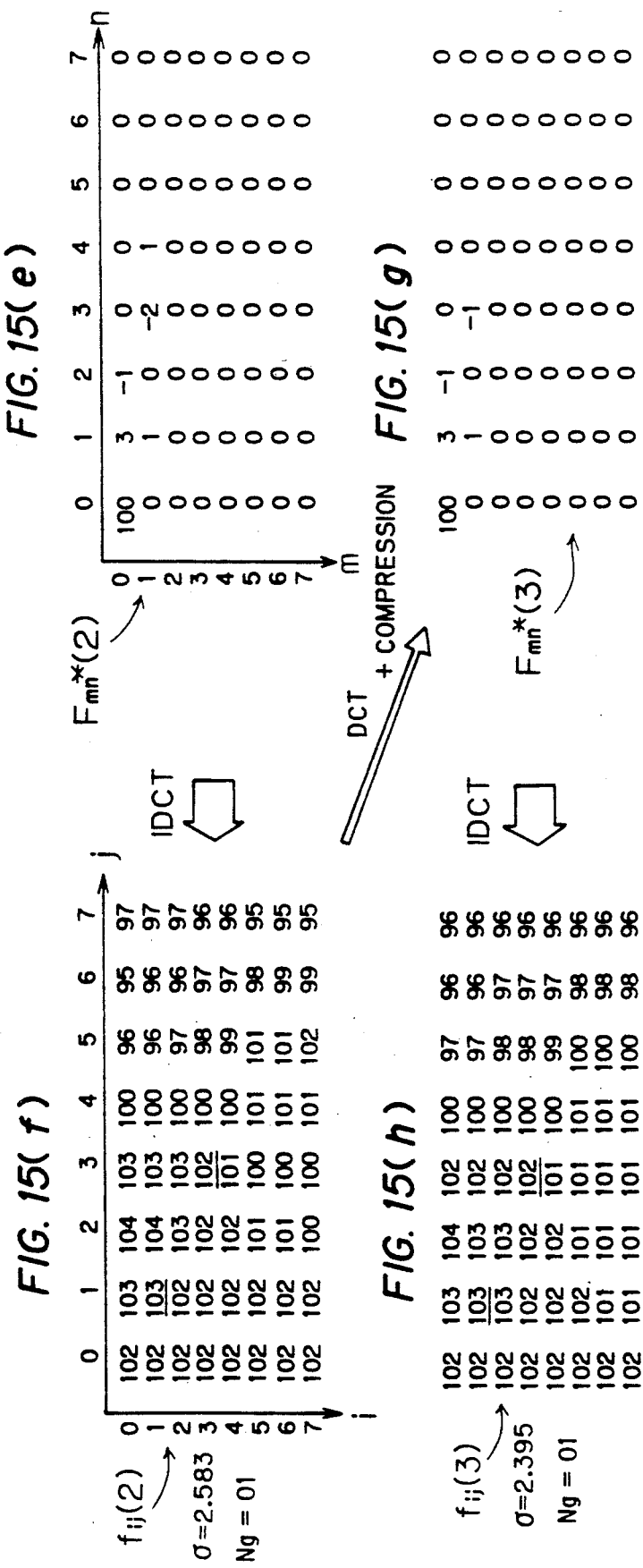

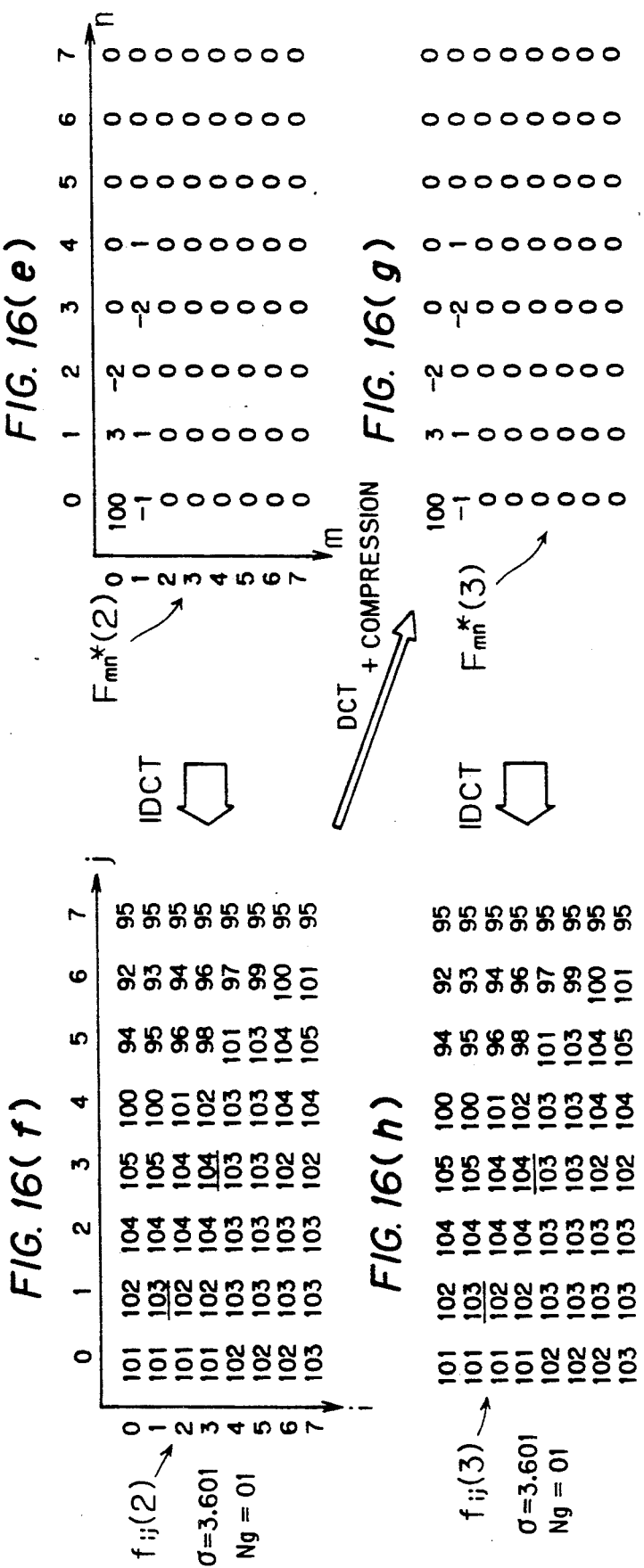

METHOD OF AND APPARATUS FOR COMPRESSING IMAGE DATA

BACKGROUND OF THE INVENTION

1. Field of the Invention

The present invention relates to a method of and an apparatus for compressing image data having graduation with respect to every pixel block for reducing the amount of data of image information.

2. Description of the Prior Art

In an image processor such as a process scanner, image data is obtained for every pixel, which is a constant small area, by reading an original image. The image data employed in the field of printing are usually larger in amount than those employed in television, and the amount of the information thereof reaches several to tens of mega bites for each image. Such a large amount of image data would require enourous memory capacity if they were stored in a data base as they were; thus the cost for data transmission would increase greatly.

In order to cope with this problem, data compression is executed on the image data for reducing the total amount of information. Several types of data compression methods are well known in the art, such as that using orthogonal transformation and the like.

However, the data compression methods in the art suffer from a trade-off between a compression rate (or compressibility) and quality of a reproduced image produced by the compressed image data. If the compression rate is increased, the quality of the image is lowered. On the other hand, the compression rate is decreased in order to raise the quality of the image. This is not a big issue for the image data employed in a television because the quality of the images of the television is relatively low compared with that employed in the field of printing.

The data compression methods in the art have another issue concerning repetition of data compression and data restoration. If the data compression is execused by high compression rate, the image quality of a restored image obtained by restoring the compressed data is lowered as compared with the orginal image. Thus, when the data compression and restoration are repeated several times, the image quality is gradually lowered.

SUMMARY OF THE INVENTION

The present invention is directed to a method of and an apparatus for compressing image data depicting an image with respect to each pixel block including a plurality of pixels, the method comprising the steps of: (a) executing an orthogonal transformation operation on the image data with respect to each pixel block, to thereby obtain a coefficient table including coefficients of a series of orthogonal functions of the image data for each pixel block, (b) preparing a plurality of code tables, each of the plurality of code tables validating a part of the coefficients of the coefficient table, (c) obtaining valid coefficients of the coefficient table with respect to each code table, the valid coefficients being validated by each code table, (d) selecting a most relevant code table most relevant to the coefficient table within the plurality of code tables on the basis of the valid coefficients, and (e) collecting the valid coefficients validated by the relevant code table, to thereby form compressed data comprising the valid coefficients for each pixel block.

Preferably, the step (d) comprises the steps of: (d-1) computing representative values for respective code tables, each of the representative values being correlated with a sum of absolute values of the valid coefficients, and (d-2) comparing the representative values with each other, thereby selecting the most relevant code table.

According to an aspect of the present invention, the plurality of code tables are classified into a plurality of groups, and the step (c) comprises the steps of: (c-1) preparing a statistical value indicative of a standard deviation of image data for each pixel block, (c-2) selecting one of the plurality of groups for each pixel block in response to the statistical value, and (c-3) computing the valid coefficients only for code tables included in the selected group.

The present invention is also directed to a method of and an apparatus for compressing image data depicting an image with respect to each pixel block including a plurality of pixels, the method comprising the steps of: (a) preparing a statistic value indicative of a standard deviation of the image data within each pixel block, (b) selecting one of prescribed procedures of data compression in response to the statistic value, (c) executing data compression on the image data according to a selected procedure, to thereby obtain first compressed data representing the image, (d) storing the first compressed data with identification data specifying the selected procedure, (e) executing data restoration on the first compressed data, to thereby obtain restored image data depicting the image and including the identification data therein, (f) identifying the selected procedure by means of the identification data included in the restored image data, and (g) executing data compression on the restored image data according to the selected procedure identified in the step (f), to thereby obtain second compressed data representing the image.

Preferably, the restored data includes a plurality of components each of which is formed as digital data and the identification data is expressed by a least significant digit of a component of the restored data, the component representing a part of the image at a prescribed position in one pixel block.

According to another aspect of the present invention, each of the prescribed procedure comprises the steps of: (1) executing an orthogonal transformation operation on the image data with respect to each pixel block, to thereby obtain a coefficient table including coefficients of a series of orthogonal functions indicative of the image data for each pixel block, (2) preparing a plurality of code tables peculiar to each of the prescribed procedures, each of the plurality of code tables validating a part of the coefficients of the coefficient table, (3) obtaining valid coefficients of the coefficient table with respect to each code table, the valid coefficients being validated by each code table, (4) selecting a most relevant code table most relevant to the coefficient table within the plurality of code tables on the basis of the valid coefficients, and (5) collecting the valid coefficients validated by the relevant code table, to thereby form compressed data comprising the valid coefficients for each pixel block.

Further, each of the plurality of code tables for a same procedure may validate a same number of the coefficients.

Moreover, the coefficients of the coefficient table may be expressed by means of digital data, and respective code elements in each of the plurality of code tables may designate respective numbers of effective digits for respective valid coefficients.

As a function of the relevant code table, only a part of the coefficients in the coefficient table are validated. Accordingly, the number of coefficients, that is, the amount of information representing the image is fairly reduced.

The restored image data including the identification data enables execution of data compression on the restored image data by the same sequence which was employed to obtain the first compressed data. Accordingly, the deterioration of the image quality is suppressed even if data compression and restoration are repeated several times.

When the identification data are expressed by means of the least significant digit of the restored data, the total amount of the restored image data is further reduced because the identification data does not exist independently.

Accordingly, an object of the present invention is to increase the compression rate (or compressibility) without lowering the image quality too much.

Another object of the present invention is to suppress the deterioration of the image qaulity when the data compression and restoration are repeated several times.

These and other objects, features, aspects and advantages for the present invention will become more apparent from the following detailed description of the present invention when taken in conjection with the accompanying drawings.

BRIEF DESCRIPTION OF THE DRAWINGS

FIGS. 3(a-1)-3(b-2) an explanatory diagrams showing examples of image data and transformation coefficients;

FIG. 4 is a conceptual diagram showing an exemplary code table;

FIGS. 13, 15 and 16 show how the sheets containing FIGS. 13(a)-13(g), 15(a)-15(g) and 16(a)-16(b); are to be arranged in order to stand in the proper relation;

FIGS. 13(a)-13(g), 15(a)-15(g) and 16(a)-16(b) when arranged according to FIGS. 13, 15 and 16 are explanatory diagrams showing exemplary cycles of compression and restoration.

DESCRIPTION OF THE PREFERRED EMBODIMENT

A preferred embodiment of the present invention will be described in sequence with reference to the following items:

A. a method of producing compressed image data;
B. a method of producing restored image data;
C. structure of an aparratus and operation thereof;
D. example of data compression and restoration; and
E. modifications.

Figure 1:
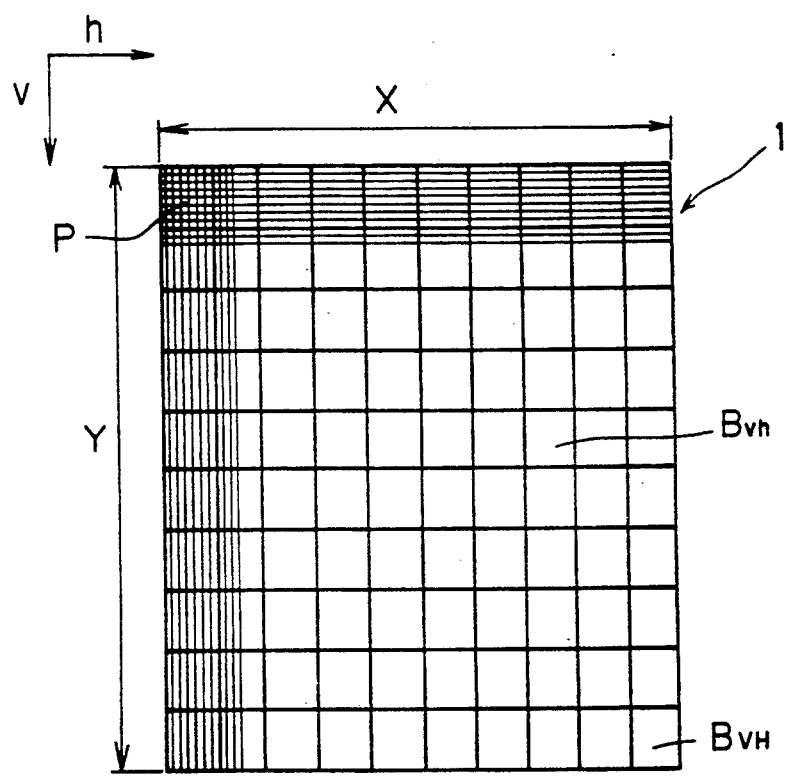
FIG. 1 is an explanatory diagram showing pixel blocks in an image.
Figure 2:
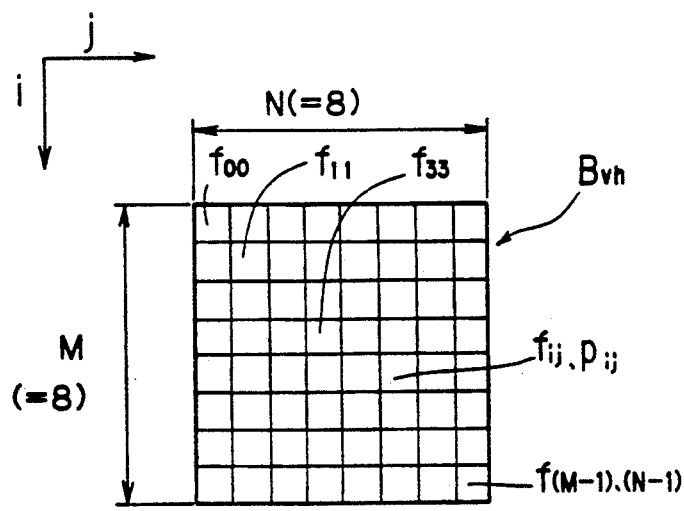
FIG. 2 is an explanatory diagram showing pixel array in a pixel block.

FIG. 1 is a conceptual diagram showing pixel blocks in an image 1. The image 1 is composed of X×Y pixels P, and is divided into V×H pixel blocks $B_{vh}$ each having a plurality of pixels. FIG. 2 is a conceptual diagram showing the structure of one pixel block $B_{vh}$. The pixel block $B_{vh}$ is composed of M×N pixels $P_{ij}$, and image data $f_{ij}$ is obtained for every pixel. Although the pixel block $B_{vh}$ is composed of 8×8 pixels in the example shown in FIG. 2, the same may be composed of 4×4 pixels or 16×16 pixels.

When data compression is executed, the image data are first subjected to orthogonal transformation with respect to every pixel block $B_{vh}$ in the image 1. Several types of the orthogonal transformation can be applied such as discrete Fourier transformation, Hadamard's transformation and the like. In this embodiment, a Discrete Cosine Transformation (hereinafter referred to as "DCT") is employed. The following equation expresses a coefficient $F_{mn}$ associated with a specific function in a series of transformation functions for DCT.

$$F_{mn} = \frac{4}{M \times N} C_{mn} \sum_{i=0}^{M-1} \sum_{j=0}^{N-1} f_{ij} \times \cos \frac{(2i+1)m\pi}{2M} \cos \frac{(2j+1)n\pi}{2N} \quad (1)$$

where $$C_{mn} = \begin{cases} 1/4: m = n = 0 \\ 1/2: m \cdot n = 0 \\ \quad \text{(except for the case of } m = n = 0) \\ 1: m \cdot n \neq 0 \end{cases}$$

m and n have values generally within ranges of zero to (M−1) and zero to (N−1), respectively.

FIG. 3 is an explanatory diagram showing the image data $f_{ij}$ within one pixel block and the transformation coefficient $F_{mn}$ obtained through the expression (1). FIG. 3(a-2) and FIG. 3(b-2) show tables FT which have the transformation coefficients $F_{mn}$. A transformation coefficient $F_{00}$ shows an average value (hereinafter referred to as "direct current component") of the image data $f_{ij}$, and remaining transformation coefficients $F_{mn}$ (hereinafter referred to as "alternate current components") show distribution of the image data $f_{ij}$. Each of the tranformation coefficients $F_{mn}$ is expressed by means of binary data of 8 bits, for example. However, the values of the coefficients are shown in decimal notation in FIG. 3, for convenience of illustration.

As can be understood from FIG. 3, the transformation coefficients $F_{mn}$ show the following character. As well as positions (m,n) at which the transformation coefficients $F_{mn}$ are nonzero, the values of the coefficients $F_{mn}$ are considerably varied in response to the distribution of the image data $f_{ij}$. Those of the transformation coefficients $F_{mn}$ having large absolute values sprecifically represent the distribution of the original image data $f_{ij}$, and the number of those tranformation coefficients $F_{mn}$ having large absolute values is increased in response to spatial uneveness of the image data $f_{ij}$.

The inventors of the present invention have directed their attention to the character of the transformation coefficients $F_{mn}$, to employ a code table which validates only a part of the alternate current components in a coefficient table FT. FIG. 4 is an explanatory diagram showing a code table. Within this code table CT, only a part of coordinates (m,n) are supplied with an effective bit number $I_{mn}$. The effective bit number $I_{mn}$ indicates that the transformation coefficient $F_{mn}$ in the position (m,n) is validated by the table CT. The effective bit number $I_{mn}$ further indicates the maximum bit number for expressing the transformation coefficient $F_{mn}$ in binary system. That is, the value of the transformation coefficient $F_{mn}$ no more than a maximum effective value $F_{max}(=(2^{I_{mn}})-1)$ is validated as it is. Referring to FIG. 4, symbol "—" indicates that the effective bit number is zero. All of the effective bit numbers $I_{mn}$ may be of the same value (8 bits, for example). However, the compression rate is raised by employing appropriate values (such as 8 bits or 3 bits, for example) which are smaller than the bit number (8 bits) of the original transformation coefficients $F_{mn}$, and which are varied with the coordinates (m,n). Even if a transformation coefficient $F_{mn}$ has a value larger than the maximum effective value $F_{max}$, its value is limited to the maximum effective value $F_{max}$ by the effective bit number $I_{mn}$. The effective bit numbers $I_{mn}$ are empirically determined to avoid such situation as much as possible and even if the transformation coefficient $F_{mn}$ is limited to the maximum effective value $F_{max}$, influence thereof can be neglected.

A plurality of the code tables CT are prepared in advance of the data compression. The respective code tables CT have different patterns and values of the effective bit numbers $I_{mn}$ from each other. The patterns of the effective bit numbers $I_{mn}$ are empirically determined in order to reproduce an image of higher image quality with a smaller number of the transformation coefficients. For example, the coefficient tables FT like those shown in FIG. 3 are first prepared for typical images such as a human figure, a landsape, a still life and the like. Then, by comparing the distribution of the coefficients in those coefficient tables FT with each other, the code tables are defined so as to represent major types of the distribution of the coefficients frequently seen in those coefficient tables.

When the transformation coefficient table FT is obtained for every pixel block $B_{vh}$ in data compression operation, an optium code table (or a relevant code table) is selected for each coefficient table FT from the plurality of code tables CT. For the purpose of such selection, the sum $S_F$ of the effective transformation coefficients $F_{mn}$ (hereinafter simply referred to as "effective sum") is obtained in accordance with the following expression:

$$S_F = \sum_{m=0}^{M-1} \sum_{n=0}^{N-1} C_{mn}|F_{mn}| \quad (2)$$

where $$C_{mn} = \begin{cases} 1: I_{mn} \neq 0 \\ 0: I_{mn} = 0 \end{cases}$$

The effective sum $S_F$ is obtained for each code table CT with respect to one coefficient table FT. The code table CT having the maximum effective sum is selected as the optium one to the coefficient table FT. The reliability of the selection of the optium code table as a funcion of the effective sum $S_F$ is further improved if the same number $N_c$ of the tranformation coefficients $F_{mn}$ (hereinafter refered to as "effective component numbers") are validated by any of the respective code tables CT. The optium code table is identified by a table number defined for each code table CT.

Compressed image data are produced on the basis of an average value of the original image data $f_{ij}$, the table number of the optium code table CT and the values of the transformation coefficients $F_{mn}$ validated by the optium code talbe CT. The effective component number $N_c$ is far smaller than the total number $M \times N$ of the transformation coefficients $F_{mn}$ within a coefficient table and the value of each transformation coefficient $F_{mn}$ is expressed by a smaller effective bit number $I_{mn}$, whereby the compression rate is quite increased. The compressed image data can be encoded by well-known Huffman codes or the like, in order to further increase the compression rate.

In this embodiment, the code tables CT are classified into a plurality of groups in response to characteristics of the image in order to still further improve the compression rate. To this end, the code tables CT are classified into a plurality of compression groups (code table groups) in response to a standard deviation $\sigma$ of the image data $f_{ij}$ obtained for every pixel block $B_{vh}$ as follows:

| | |
|---|---|
| $\sigma < \sigma_1$: | compression group $g_1$ including code tables $CT_{11}$ to $CT_{1L}$ |
| $\sigma_1 \leq \sigma < \sigma_2$: | compression group $g_2$ including code tables $CT_{21}$ to $CT_{2L}$ |
| $\sigma_2 \leq \sigma < \sigma_3$: | compression group $g_3$ including code tables $CT_{31}$ to $CT_{3L}$ |
| $\sigma_3 \leq \sigma$: | compression group $g_4$ including code tables $CT_{41}$ to $CT_{4L}$ |

(where $\sigma_1$, $\sigma_2$ and $\sigma_3$ represent threshold values) Number L of the code tables may be varied with the compression groups $g_1$ to $g_4$.

Figure 5:
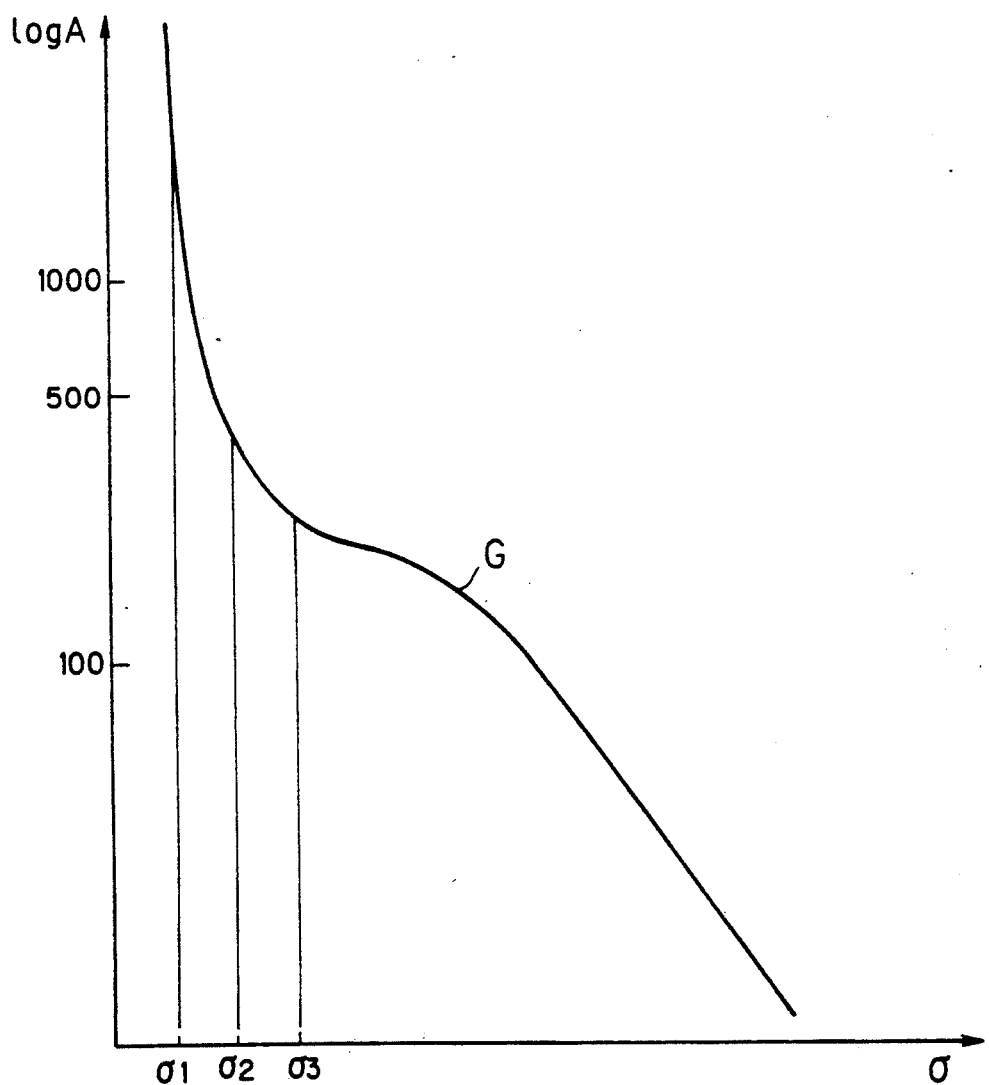
FIG. 5 is an explanatory diagram showing exemplary relation between standard deviation of image data and numbers of appearance thereof.

FIG. 5 illustrates distribution G of frequency A of the standard deviation $\sigma$ in an overall image 1. Referring to FIG. 5, the frequency A is shown in logarithmic scale along the vertical axis.

The first threshold value $\sigma_1$ is determined such that the image in the pixel block is fairly even when the standard deviation $\sigma$ is less than the same. In such a pixel block, because the alternate current components of the transformation coefficients are small, the image quality is not so much lowered even if a code table having a small value of the effective component number $N_c$ is employed for the data compression. Since the frequency A of a pixel block having smaller standard deviation $\sigma$ is generally higher as understood from FIG. 5, the compression rate is much improved by treating all of such pixel blocks with the code tables having a small effective component number $N_c$.

When the standard deviation $\sigma$ is between the first and second threshold values $\sigma_1$ and $\sigma_2$, this indicates that the image is loosely changed in the pixel block. In this case, it is better to employ a code table having an effective component number $N_c$ larger than that of the compression group $g_1$, in order to maintain the image quality. Since this compression group $g_2$ also corresponds to a range of relatively high frequency A, the compression rate attained by employing the code tables having a relatively small value of the effective component number $N_c$ in the compression group $g_2$ is also high.

While the frequency A becomes relatively low with respect to a range of the standard deviation $\sigma$ more than the second threshold value $\sigma_2$, the compression rate would be decreased if all of such pixel blocks were processed with a code table having a large effective component number $N_c$. Thus, the third threshold value $\sigma_3$ is employed for further classification of the code tables.

Respective effective component numbers $N_{c1}$ to $N_{c4}$ of code tables $CT_{1k}$ to $CT_{4k}$ (k=1 to L) of the respective compression groups $g_1$ to $g_4$ are in the following relation:

$$0 \leq N_{c1} \leq N_{c2} \leq N_{c3} \leq N_{c4} \leq M \times N - 1 \quad (3)$$

The effective component numbers of the code tables are constant within the respective compression groups. When $N_{c1}=0$, the compressed image data of a pixel block $B_{vh}$ belonging to the compression group $g_1$ is expressed only by the average of the pixel data $f_{ij}$, that is, only by the direct current component $F_{00}$.

Prior to the data compression operation, the threshold values $\sigma_1$ to $\sigma_3$ and the code tables $CT_{1k}$ to $CT_{4k}$ classified into the compression groups $g_1$ to $g_4$ are prepared. One of the compression groups $g_1$ to $g_4$ is selected in response to the standard deviation $\sigma$ of the block $B_{vh}$, and the optimum code table is selected from code tables included in the selected compression group.

Restored image data $f_{ij}$ in a pixel block are obtained by executing Inverse Discreet Cosine Transformation (or IDCT) on the transformation coefficients $F_{mn}$ of compressed image data.

IDCT is expressed as follows:

$$f_{ij} = \sum_{m=0}^{M-1} \sum_{n=0}^{N-1} F_{mn} \times \cos \frac{(2i+1)m\pi}{2M} \cos \frac{(2j+1)n\pi}{2N} \quad (4)$$

The restored image data is so formed as to indicate which one of the compression groups $g_1$ to $g_4$ is employed for producing the compressed image data. Such information indicating the compression group is hereinafter referred to as "group information".

In order to record the group information in the restored image data $f_{ij}$, similar information is also stored in the compressed image data. In the compressed image data, the code table number has a function of representing the group information, as hereinafter described.

The group information is integrated into the restored image data $f_{ij}$ by using the least significant digits of the restored image data at prescribed pixel positions within a pixel block, for example.

When the restored image data are expressed in binary system, two values ("0" and "1") of a least significant bit distinguish two compression groups. The value of "0" of a least significant bit is hereinafter simply referred to as "even" while the value "1" is referred to as "odd".

Since four compression groups are employed in this embodiment, the group information can be expressed by two bits. Within the pixel block $B_{vh}$ shown in FIG. 2, two image data $f_{11}$ and $f_{33}$ are selected and their values are adjusted as follows to record the group information:

| compression group $g_1$: | both of $f_{11}$ and $f_{33}$ are made even |
|---|---|
| compression group $g_2$: | $f_{11}$ is made odd and $f_{33}$ is made even |
| compression group $g_3$: | $f_{11}$ is made even and $f_{33}$ is made odd |
| compression group $g_4$: | both of $f_{11}$ and $f_{33}$ are made odd |

The image data $f_{11}$ is made even in accordance with the following expression, for example:

$$f_{11} = f\!f_{11}\ \&\ 254 \quad (5)$$

where
  $f\!f_{11}$: image data before being made even
  $f_{11}$: image data after being made even
  &: bit-AND operator The bit-AND operator & expresses operation of obtaining logical product for each bit of binary number. The expression (5) is expressed in 8-bit binary numbers as follows;

$$e_7\ e_6\ e_5\ e_4\ e_3\ e_2\ e_1\ e_0 = \quad (6)$$

$$a_7\ a_6\ a_5\ a_4\ a_3\ a_2\ a_1\ a_0\ \&\ 1\ 1\ 1\ 1\ 1\ 1\ 1\ 0$$

where
  $e_i$ (i=0 to 7): each bit of image data $f_{11}$
  $a_i$ (i=0 to 7): each bit of image data $f\!f_{11}$ Through the function of the bit-AND operator &, the expression (6) is transformed as follows:

$$e_7\ e_6\ e_5\ e_4\ e_3\ e_2\ e_1\ e_0 = a_7\ a_6\ a_5\ a_4\ a_3\ a_2\ a_1\ 0 \quad (7)$$

That is, whatever value the image data $f\!f_{11}$ has, the least signification bit $e_0$ of the image data $f_{11}$ is always zero after the transformation by the expression (5). Further, the difference between the image data $f_{11}$ and $f\!f_{11}$ is not more than 1 and hence influence of the difference on the image quality can be neglected.

On the other hand, the image data is made odd through the following expression:

$$f_{11} = (f\!f_{11}\ \&\ 254) + 1 \quad (8)$$

Since the least signification bit of the image data $f_{11}$ in the left hand side is always 1, the image data $f_{11}$ is an odd number. Further, since the maximum value of the first term ($f_{11}$ & 254) in the right hand side is 254, the maximum value of the image data $f_{11}$ is 255. Thus, the maximum value 255 of the image data is not exceeded by the operation of the expression (8). Further, the difference between the image data $f_{11}$ and $f\!f_{11}$ is not more than 1 and hence influence of the difference on the image quality can be neglected.

Although the above description has been made on the operation of the image data $f_{11}$, the same also applies to the image data $f_{33}$.

As a function of the least signification bits $e_{110}$ and $e_{330}$ of the image data $f_{11}$ and $f_{33}$ after being made even or odd, the group information $N_g$ is expressed in the following 2 bit binary number:

$$N_g = e_{330} e_{110} \quad (9)$$

Relation between the group information $N_g$ and the compression groups $g_1$ to $g_4$ is as follows:

compression group $g_1$: $N_g = 00$ (10a)

compression group $g_2$: $N_g = 01$ (10b)

compression group $g_3$: $N_g = 10$ (10c)

compression group $g_4$: $N_g = 11$ (10d)

The respective bits forming the group information $N_g$ are not restricted to those of the image data $f_{11}$ and $f_{33}$, but the least significant bits at two arbitrary pixel positions can be employed. Although the group information $N_g$ is expressed in a 2-bit binary number in this embodiment because of four compression groups, the bit number may be increased if more compression groups are employed.

As hereinabove described, the restored image data are so formed as to include the group information, whereby the restored image data can be identified as being in the same compression group as the previous one in which the original image data before compression were included.

Figure 6:
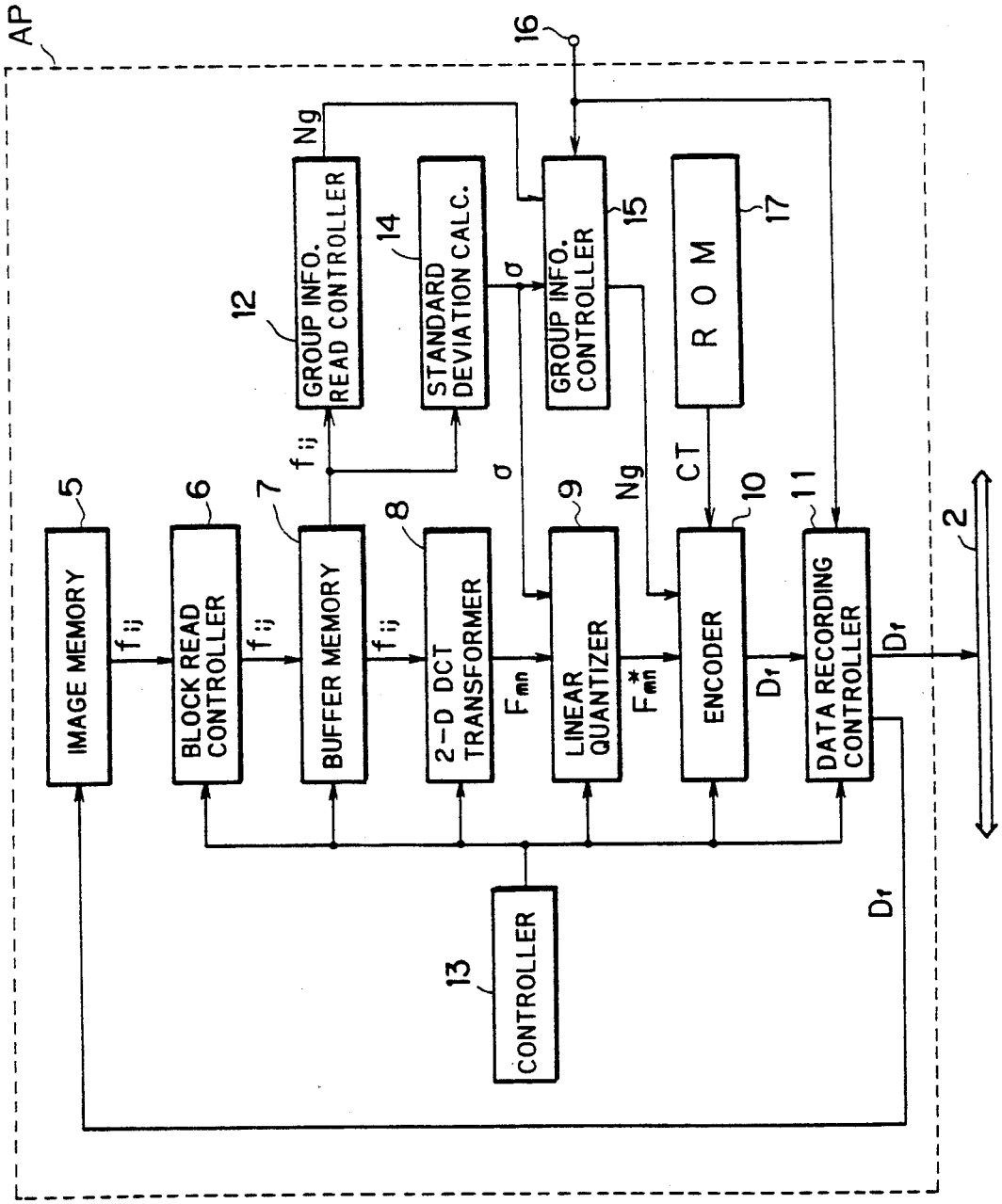
FIG. 6 is a schematic block diagram showing an apparatus to which an embodiment of the present invention is applied.
Figure 7A:
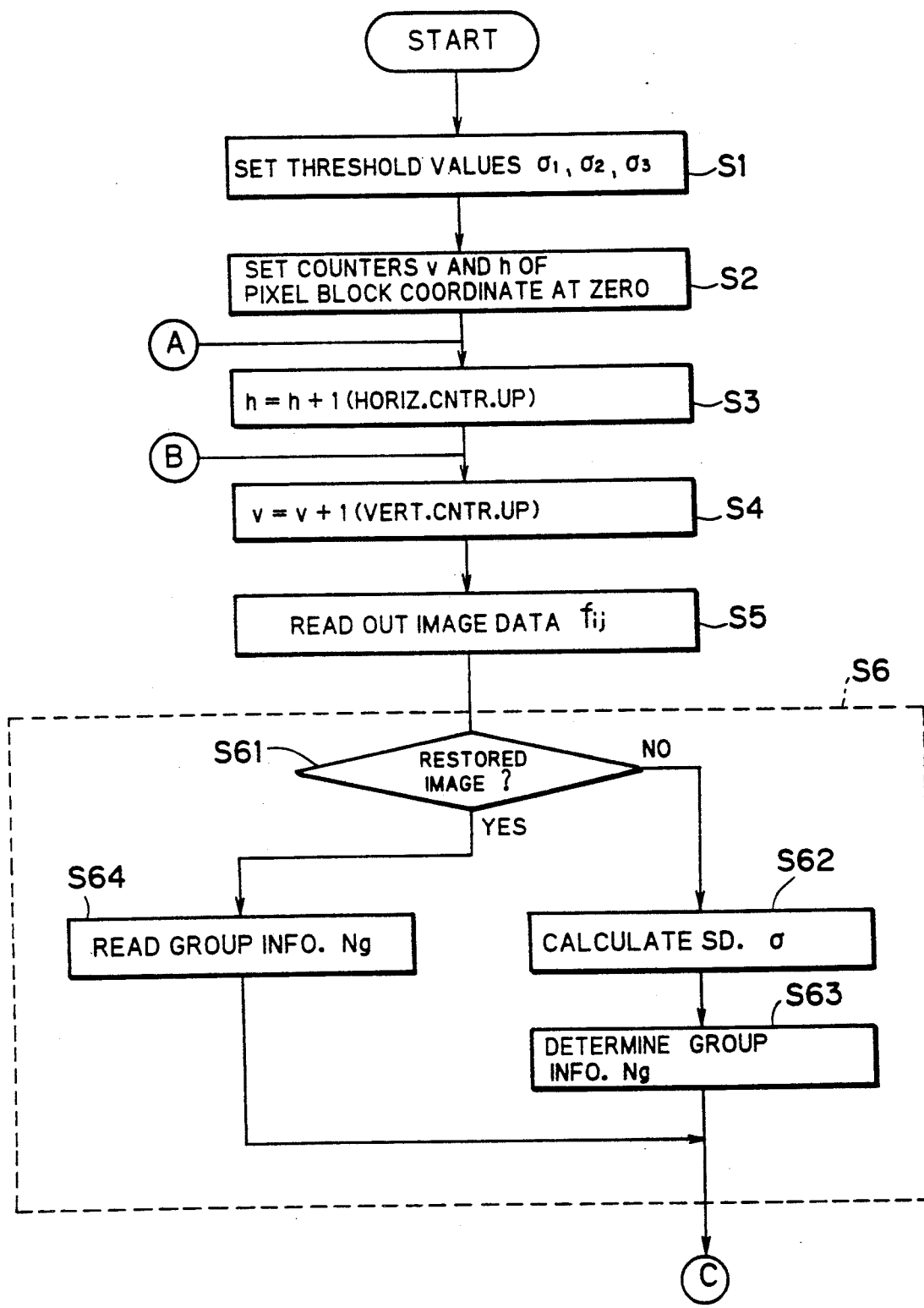
FIGS. 7A, 7B and 8 are flow charts for illustrating the embodiment of the present invention.
Figure 7B:
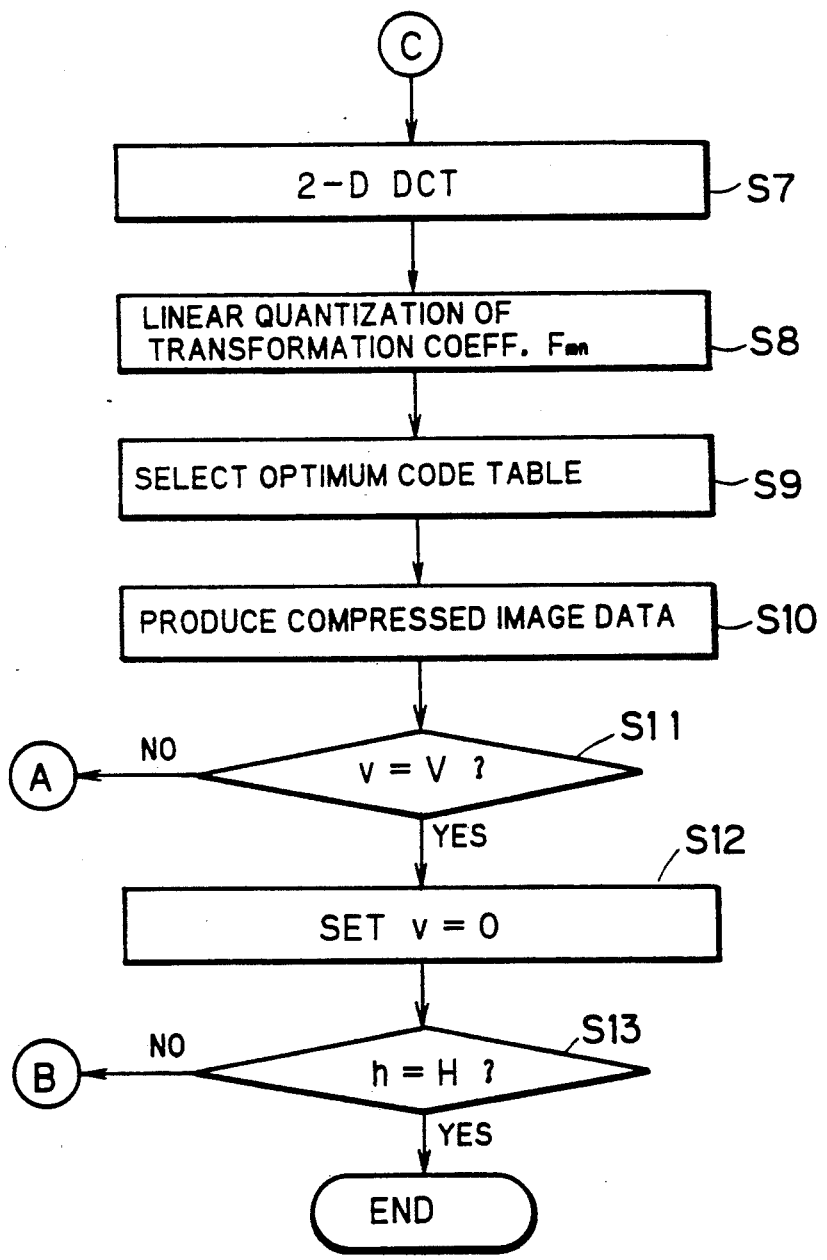

FIG. 6 is a schematic block diagram showing the structure of an image compressor embodying the present invention. Referring to FIG. 6, an image data compressor AP comprises an image memory 5, a block read controller 6, a buffer memory 7, a two-dimensional DCT transformer 8, a linear quantizer 9, an encoder 10, a recording controller 11, a group-information read controller 12, a standard deviation calculator 14, a group information controller 15, a ROM 17 and a controller 13. The operation of the image data compressor AP will be described along flow charts shown in FIGS. 7A and 7B.

At a step S1, the threshold values $\sigma_1$ to $\sigma_3$ of the standard deviation are inputted through a parameter input terminal 16 provided in the exterior of the data compressor AP, and set in the group information controller 15. Steps S2 to S4 and S11 to S13 are adapted to sequentially select pixel blocks $B_{vh}$ to be processed.

At a step S5, the block read controller 6 reads image data $f_{11}$ within one pixel block $B_{vh}$, and stores the same in the buffer memory 7.

A step S6 is adapted to determine the group information $N_g$. At step S61, a decision is made as to whether or not the image data $f_{ij}$ are those of a restored image. If the image data $f_{ij}$ are those of a restored image, the image data $f_{ij}$ has data indicating that they are restored image data, in a header portion of a data file of the image data $f_{ij}$, for example. The aforementioned decision is made in accordance with presence/absence of such data.

If the image data $f_{ij}$ are not those of a restored image but those of an original, steps S62 and S63 are carried out. At the step S62, the image data $f_{ij}$ are supplied from the buffer memory 7 to the standard deviation calculator 14, which in turn calculates the standard deviation $\sigma$. At the step S63, the standard deviation $\sigma$ is supplied from the calculator 14 to the group information controller 15, which in turn determine the group information $N_g$, That is, the group information controller 15 compares the standard deviation $\sigma$ with the threshold values $\sigma_1$ to $\sigma_3$, to determine which one of the of the compression groups $g_1$ to $g_4$ the pixel block belongs to. Then the controller 15 determines the group information $N_g$ by the expressions (10a) to (10d).

When the image data $f_{ij}$ are those of a restored image, on the other hand, a step S64 is carried out. At this step, the group information $N_g$ is synthesized by respective least significant bits $e_{110}$ and $e_{330}$ of image data $f_{11}$ and $f_{33}$ at two pixel positions, as shown by the expression (9). Referring to FIG. 6, the image data $f_{11}$ and $f_{33}$ are read out from the buffer memory 7 in the group-information read controller 12. The read controller 12 synthesizes the group information $N_g$ through the image data $f_{11}$ and $f_{33}$, and supplies the same to the group information controller 15. Thus, when the group information $N_g$ is supplied from the read controller 12, the controller 15 holds the group information $N_g$ and performs no operation of determining the group information $N_g$ on the basis of the standard deviation $\sigma$.

When the group information $N_g$ is determined at the step, S6, the image data $f_{ij}$ are transmitted from the buffer memory 7 to the two-dimensional DCT transformer to be subjected to DCT at a step S7.

At a step S8, the transformation coefficients $F_{mn}$ are linearly quantized. As is well known in the art, "linear quantization" means proccessing of dividing a transformation coefficient $F_{mn}$ by a predescribed value $\alpha$ ('quantum width") and making the value $F_{mn}/\alpha$ to be integral when the values $F_{mn}/\alpha$ includes decimal part. The value of the quantum width $\alpha$ may be fixed, or may be varied the standard deviation $\sigma$. Such linear quantization may not be performed, as hereinafter described.

At a step S9, an optimum code table is selected with respect to a coefficient table FT* having the lineary quantized transformation coefficients $F_{mn}$*.

Figure 8:
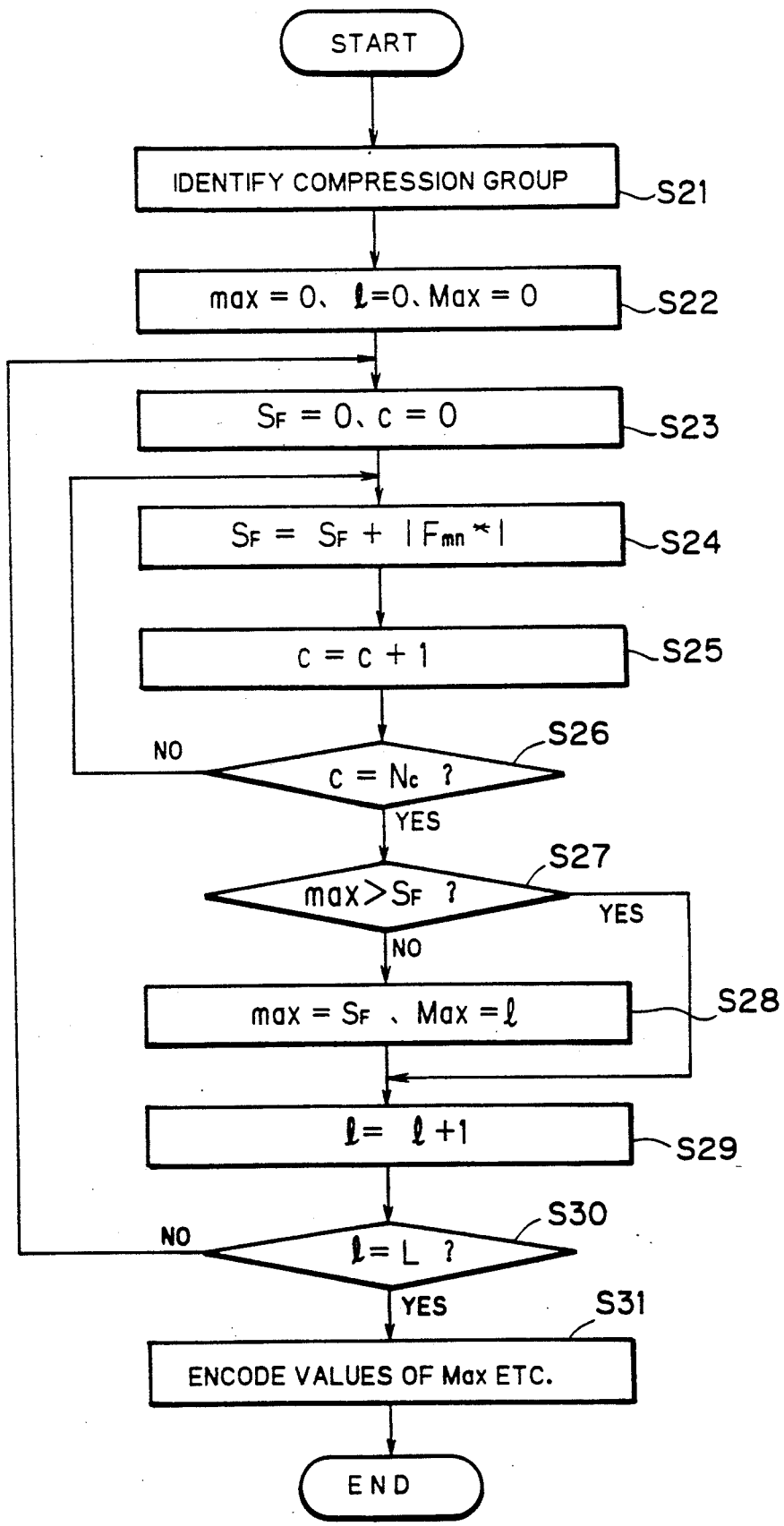

FIG. 8 is a flow chart showing the procedure of selecting the optimum code table carried out by the encoder 10 at the step S9. Referring to FIG. 8, meaning of each symbol is as follows:

| | |
|---|---|
| max: | parameter for obtaining maximum value of effective sum $S_F$ |
| Max: | parameter representing a code table number of a code table having the maximum effective sum $S_F$ |
| l: | parameter representing a code table number |
| L: | number of the code tables |
| c: | parameter representing a serial number of a effective current component |
| $N_c$: | number of the effective alternate current components |

At a step S21, the compression group of the pixel block under process is identified as a function of the compressing group information $N_g$. Steps S22 to S30 are adapted to select that code table within L pieces of code tables of the compression group, which code table has the maximum effective sum $S_F$ (see expression (2)).

Figure 9:
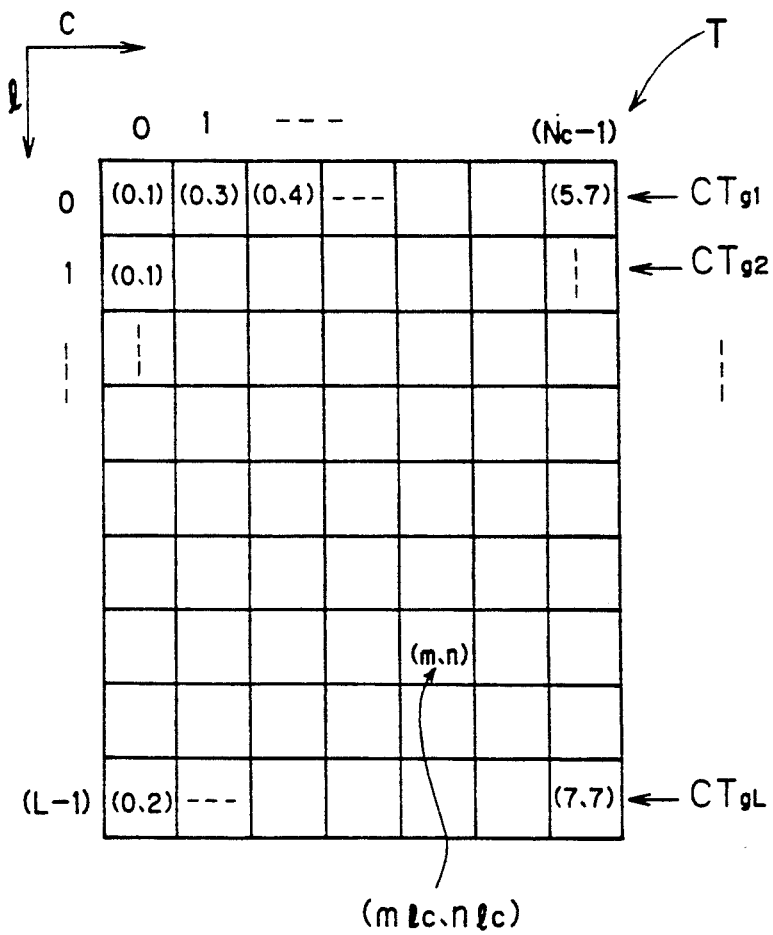
FIG. 9 is a conceptual diagram showing an exemplary subtable.

At the steps S23 to S26 for obtaining the effective sums $S_F$, a subtable T shown in FIG. 9, which is stored in the ROM 17, is employed. The subtable T specifies coordinate values $(m_{lc}, n_{lc})$ of the coordinate positions in which the effective bit numbers $l_{mn}$ are nonzero. The subtables T are prepared for respective code tables $CT_{g1}$ to $CT_{gl}$ within one compression group $g_i$ ($i=1$ to 4). Where $l=0$ to $(L-1)$ and $c=0$ to $(N_c-1)$. The subscript g of the code tables $CT_{g1}$ to $CT_{gL}$ represent the compression group $g_i$. As to one code table $CT_g$, the coordinates ($m_{lc}$, $n_{lc}$) are sequentially called from the subtable T, and absolute values of the transformation coefficients $F_{mn}*$ of the transformation coefficient table FT* at the coordinates ($m_{lc}$, $n_{lc}$) are added up at the step S24.

The code table having the maximum effective sum $S_F$ is selected as the optimum code table. When the optimum code table is thus selected, the effective transformation coefficients $F_{mn}*$ of the coefficient table FT* are specified by the optimum code table and are expressed in the effective bit numbers $I_{mn}$ (six bits, for example), while the other transformation coefficients $F_{mn}*$ are neglected. At a step S31, the table number Max of the optimum code table and the transformation coefficients $F_{mn}*$ specified as effective by the optimum code table are transformed into a Huffman code train, to form compressed image data (steps S31 and S10). The average value of the original image data $F_{ij}$ may be simultaneously Huffman-coded at this time, while only the average value may be encoded by a method such as the so-called predictive encoding, independently of the step S31.

Compressed image data (encoded data) $D_f$ thus obtained are transmitted to the data recording controller 11 from the encoder 10, and further outputted to the image memory 5 or a transmission path for an external circuit (not shown). A selection command for this output is inputted in the parameter input terminal 16 by an operator in advance of the compression of the image data, and initialized in the data recording controller 11.

Figure 10A:
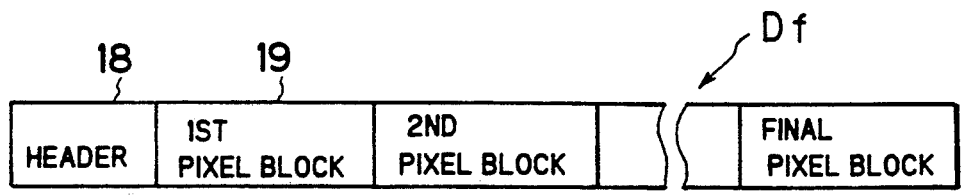
FIGS. 10A and 10B are conceptual diagrams showing the structure of compressed image data.
Figure 10B:

FIGS. 10A and 10B are conceptual diagrams showing the file structure of the encoded compressed image data $D_f$. A header 18 of FIG. 10A includes the threshold values $\sigma_1$, $\sigma_2$ and $\sigma_3$ etc., and the code trains of respective pixel blocks are arranged following the header 18. FIG. 10B is the internal structure in a code train 19 of each pixel block, which is formed of the table number Max of the optimum code table and the code train of the transformation coefficients $F_{mn}*$ specified as effective by the optimum code table.

Figure 11:
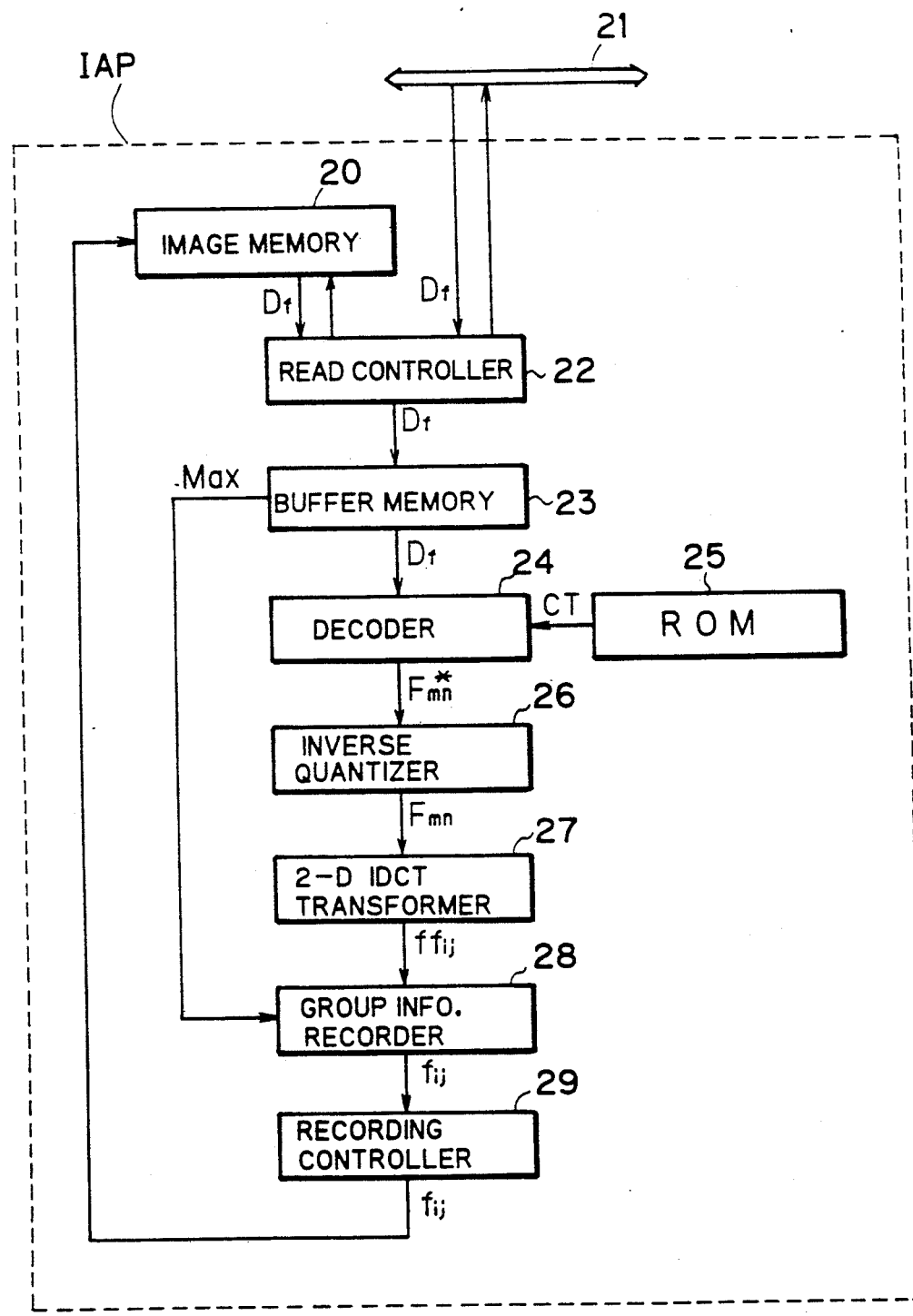
FIG. 11 is a schematic block diagram showing a restoration apparatus.

FIG. 11 is a schematic block diagram showing a restoration apparatus for restoring the encoded compressed image data $D_f$. This restoration apparatus IAP comprises an image memory 20, a read controller 22, a buffer memory 23, a decoder 24, a ROM 25, an inverse quantizer 26, a two-dimensional IDCT Transformer 27, a group information recorder 28 and a recording controller 29.

The compressed image data $D_f$ are read out from the image memory 23 or a transmission path 21 by the read controller 22, and supplied to the buffer memory 23 and further transmitted to the decoder 24. The ROM 25 stores a code table identical to that employed for the compression of the image data, a Huffman code table for decoding the Huffman code train, and the like, The compressed image data $D_f$ are decoded into the transformation coefficients $F_{mn}*$ by the decoder 24. The transformation coefficients $F_{mn}*$ are inverse-quantized by the inverse quantizer 26. That is, the transformation coefficients $F_{mn}*$ ($=F_{mn}/\alpha$) linearly quantized with the quantum width $\alpha$ is multiplied by the quantum width $\alpha$. The transformation coefficients $F_{mn}$ thus obtained are inverse-converted by the two-dimensional IDCT Transformer 27, whereby the image data $ff_{ij}$ of each pixel within the pixel block are obtained.

Figure 12:
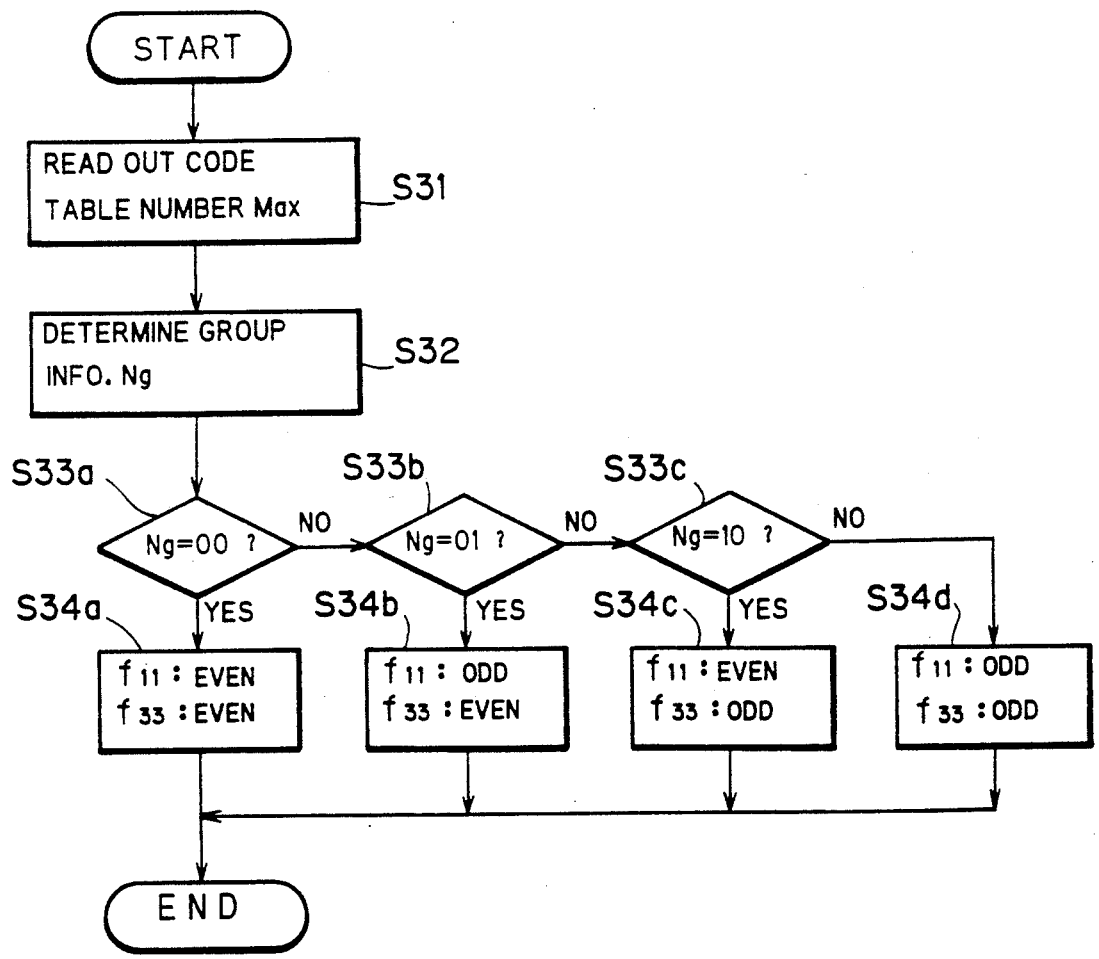
FIG. 12 is a flow chart showing the procedure of a method of recording group information.

On the basis of the image data $ff_{ij}$ thus obtained, the group information recorder 28 records the group information in the image $ff_{ij}$. FIG. 12 is a flow chart showing the recording procedure. At a step S31, the group information recorder 28 reads out the code table number Max within the compressed image data $D_f$ from the buffer memory 23. At a step S32, the group information $N_g$ is determined from the code table number Max. Through steps S33a to S33c and S34a to S34d, the image data $ff_{11}$ ($f_{11}$) and $ff_{33}$ ($f_{33}$) are made odd/even. The steps S34a to S34d are carried out through the expressions (5) and (8).

The image data $f_{ij}$ in which the group information $N_g$ is recorded are stored in the image memory 20 by the recording controller 28. Image data $f_{ij}$ for the overall image can be obtained by performing the restoration processing operation on all of the pixel blocks.

In order to re-compress image data $f_{ij}$ once restored, the group information $N_g$ is read out from the least significant bits of two image data $f_{11}$ and $f_{33}$. Data compression is performed according to the compression group identified by the group information $N_g$. Firstly, an example 1 will be described in which the linear quantization of $F_{mn}$ is not performed.

FIGS. 13(a)–13(g) are explanatory diagrams showing image data $f_{ij}$ and transformation coefficient $F_{mn}$ in a first example of repeating compression and restoration. Image data $f_{ij}$(0) of FIG. 13A(a) represents image data of an original, and $f_{ij}$(k) (k=1 to 3) of FIG. 13A(d), FIG. 13B(f) and (h) represents image data obtained by the k-th restoration after alternate data compression and restoration. $F_{mn}$(k) (k=1 to 3) of FIG. 13A(c), FIG. 13B(e) and (g) represent transformation coefficients obtained by the K-th compression after alternate data compression and restoration.

In this example, the transformation coefficient $F_{mn}$ are not subjected to linear quantization. Therefore, the transformation coefficients $F_{mn}$ of decimal values obtained by DCT are not made to be integers but directly preserved as the compressed image data $D_t$ and restored therefrom. In FIGS. 13(a)–13(g), only integral parts of the transformation coefficients $F_{mn}$ are shown for convenience of illustration. On the other hand, the image data $f_{ij}$(k) are regularly preserved and restored in integral values.

First, the image data $f_{ij}$(0) of the original are DC transformed to the transformation coefficients $F_{mn}^0(1)$ of FIG. 13(b). These transformation coefficients $F_{mn}^0(1)$ are not yet subjected to the selection of effective alternate current components by a code table, but have 19 alternate current components.

Then, the transformation coefficients $F_{mn}(1)$ of FIG. 13(b) are obtained as the result of the selection of the effective alternate current components by the code table. These transformation coefficients $F_{mn}(1)$ include six effective alternate current components $F_{01}$, $F_{02}$, $F_{10}$, $F_{11}$, $F_{13}$ and $F_{14}$.

The restored image data $F_{ij}(1)$ of FIG. 13(d) are obtained by IDCT of the transformation coefficients $F_{mn}(1)$.

Figure 14:
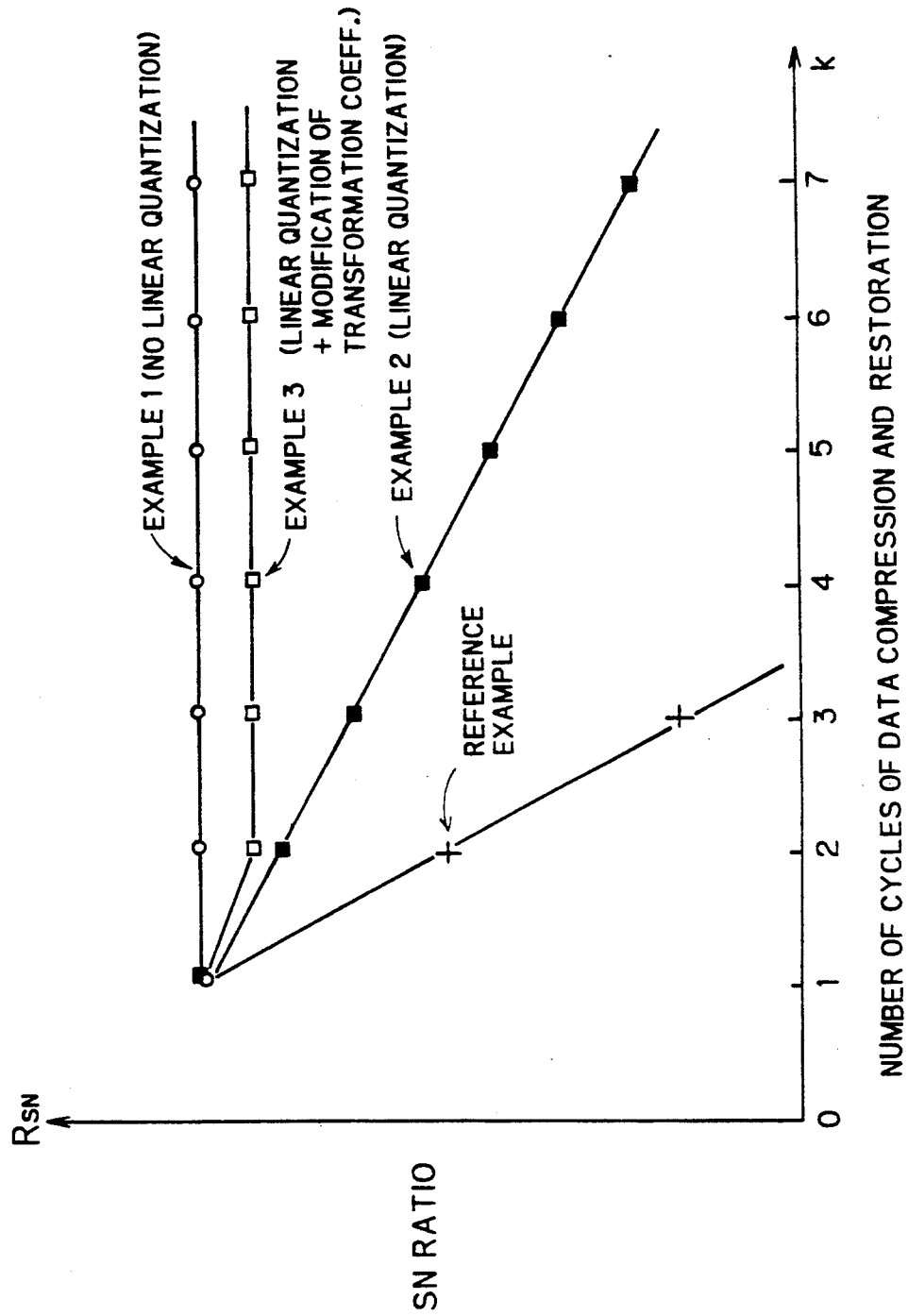
FIG. 14 illustrates SN ratios of restored images.
Figure 16A:
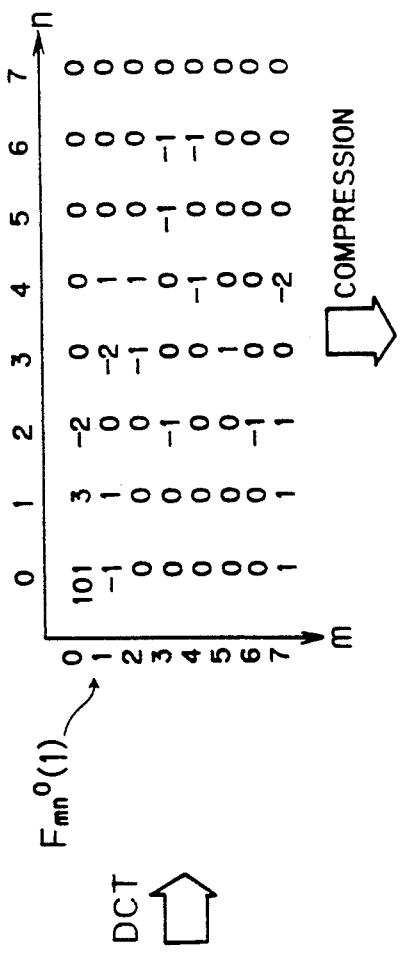
Figure 16B:
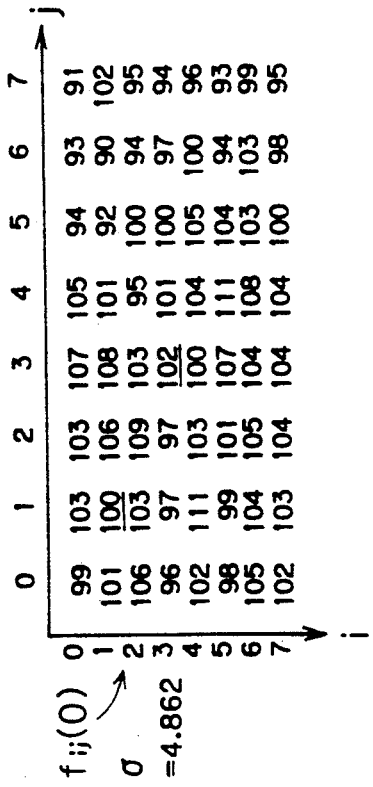
Figure 16C:
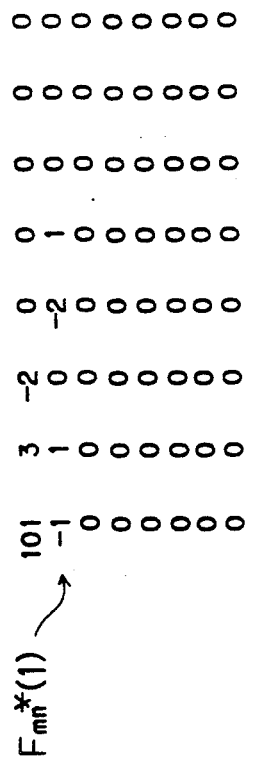
Figure 16D:
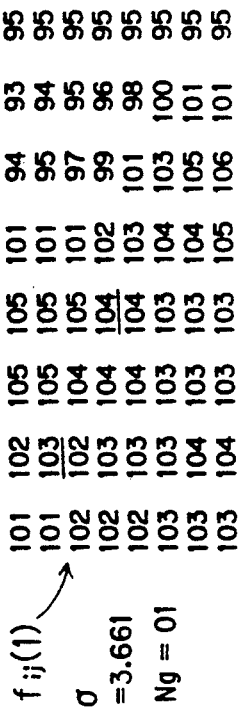

In the example shown in FIG. 14, the threshold value $\sigma_1$ is set at 4.0 and the threshold values $\sigma_2$ and $\sigma_3$ are set to be at least 5.0. Since the standard deviation $\sigma$ of the image data $f_{ij}$(0) of the original is 4.862 as shown in FIG. 13(a), the image data $f_{ij}$(0) belong to the compression group $g_2$.

On the other hand, since the standard deviation $\sigma$ of the image data $f_{ij}(1)$ restored after the first data compression is 3.621, the image data $f_{ij}(1)$ would belong to the compression group $g_1$ if the same were classified by the value of the standard deviation $\sigma$. However, as hereinabove described, the information indicating that the image data $f_{ij}(0)$ of the original belonged to the compression group $g_2$, i.e., the group information $N_g=01$ (binary notation) is recorded by even/odd of the data $f_{11}(1)$ and $f_{33}(1)$ (underlined in FIG. 13(d)) of the image data $f_{ij}(1)$. In more concrete terms, the data $f_{11}(1)$ is adjusted to be odd and $g_{33}(1)$ is adjusted to be even, as hereinabove described. Accordingly, from the second data compression, the image data $f_{ij}(1)$ is specified to belong to the compression group $g_2$.

Since the transformation coefficients $F_{mn}(k)$ are accurately preserved as decimal values in the example, DCT is carried out reversibly. Therefore, the restored image data $f_{ij}(2)$ and $f_{ij}(3)$ obtained after the second cycle of the data compression and restoration are equal to the restored image data $f_{ij}(1)$ after the first cycle of the data compression and restoration.

FIG. 14 illustrates transition of image quality of the restored images as SN ratios of the image data $f_{ij}(k)$. SN ratios $R_{SN}$ corresponding to the case shown in FIGS. 13(a)-13(g) (Example 1) are shown with white circles. The SN ratio $R_{SN}$ is defined as follows:

$$R_{SN} = 10 \log_{10}(255^2/r) \qquad (11a)$$

$$r = \frac{1}{X \times Y} \sum_{i=0}^{X-1} \sum_{j=0}^{Y-1} (\Delta f_{ij})^2 \qquad (11b)$$

where $f_{ij}$ represents a difference between image data of an original and that of a restored image. Symbols X and Y in the expression (11b) represent numbers of colums and rows of pixels existing in the whole image (see FIG. 1).

As understood from FIG. 12, the SN ratio $R_{SN}$ is not changed after the restored image data $f_{ij}(1)$ in the example 1, that is, the deterioration of image quality is prevented.

FIG. 14 also shows a reference example, in which data compression and restoration are repeated without applying the present invention, for example. According to the reference example in which the compression groups is identified by the value of standard deviation $\sigma$, the image data is decided to belong to the compression group $g_1$ in the second data compression operation. Therefore, the image quality of a restored image after the second data compression is extremely deteriorated, and the value of its $S_N$ ratio $R_{SN}$ is also extremely reduced as shown in FIG. 14.

Examples 2 and 3 will be described next, in which the quantization of $F_{mn}$ is performed. In the Example 1, the transformation coefficients $F_{mn}$ are not subjected to the linear quantization. However, if the transformation coefficients $F_{mn}$ are linearly quantized, storage capacity required for preserving the transformation coefficients $F_{mn}$ can be extremely reduced and the compression rate can be further improved.

FIGS. 15(a)-15(g) are explanatory diagrams showing image data $f_{ij}(k)$ and transformation coefficients $F_{mn}*(k)$ with linear quantization on the transformation coefficients $F_{mn}*$. The subscripts * are attached to the transformation coefficients indicating that the same are linearly quantized.

Since the value of the quantum width $\alpha$ is "1", the term "linear quantization" herein used is the same as to round to the nearest whole number. The round-off operation is performed by counting fractions over ½ as one and disregarding the rest.

The SN ratio $R_{SN}$ of the image data $f_{ij}(k)$ in the Example 2 shown in FIGS. 15(a)-15(g) is shown with black squares in FIG. 14. Although the SN ratio $R_{SN}$ of the Example 2 where the coefficients $F_{mn}$ are linearly quantized decreases more quickly than that of the Example 1 where the linear quantization is not executed, the SN ratio $R_{SN}$ of the Example 2 decreases more slowly than that of the reference example, and the image quality is also lowered more slowly. It is because the errors caused by the round-off operation in the linear quantization of the transformation coefficients $F_{mn}$ are accumulated, dissimilarly to the case of the Example 1.

In order to further suppress the progress of the deterioration of the image quality, the following method can be employed: Before performing IDCT on the transformation coefficients $F_{mn}*(k)$, values of the transformation coefficients $F_{mn}*(k)$, which are effective alternate current components, are modified as follows:

$$\text{when } F_{mn}* > 0, \; FF_{mn} = F_{mn}* + 0.5 \qquad (12a)$$

$$\text{when } F_{mn}* < 0, \; FF_{mn} = F_{mn}* - 0.5 \qquad (12b)$$

The modified transformation coefficients $FF_{mn}$ are subjected to the IDCT. Application of the expression (12a) or (12b) is hereinafter referred to as "modification of the transformation coefficients $F_{mn}*$".

FIGS. 16(a)-16(g) show examples of the image data $f_{ij}(k)$ and the transformation coefficients $F_{mn}*$ in the Example 3 where the modification of the transformation coefficients is performed. The SN ratio $R_{SN}$ of the Example 3 is shown with white squares in FIG. 14. The SN ratio $R_{SN}$ of the Example 3 holds relatevely large, and the SN ratio $R_{SN}$ is maintained constant after the second cycle of the data compression and restoration.

The expressions (12a) and (12b) are introduced on the basis of the following idea: When the image data $f_{ij}(1)$ of FIG. 15(d), which are restored with no modification of the transformation coefficients $F_{mn}*$, are compared with the image data $f_{ij}(0)$, the restored image data $f_{ij}(1)$ have smaller differences of data values between the pixels. That is, the image data after one cycle of the data compression and restoration are averaged in the pixel block to some extent. On the other hand, the absolute values $|F_{mn}*|$ of the transformation coefficients $F_{mn}*$ denote amplitudes of respective frequency components of the image data $f_{ij}$ restored as a function of the transformation coefficients $F_{mn}*$, as shown in the expression (4). Therefore, when the absolute values $|F_{mn}*|$ are increased, the amplitudes of the respective frequency components are increased so that the restored image data $f_{ij}$ represent more undulation in the pixel bock. The expressions (12a) and (12b) are equivalent to the increase of the absolute values $|F_{mn}*|$. Therefore, when the transformation coefficients $F_{mn}*$ are modified by the expressions (12a) and (12b) to restore the image data, an effect of averaging of the image data by the data compression is cancelled by the modification by these expressions.

The expressions (12a) and (12b) are generally expressed as follows:

when $F_{mn}^* > 0$, $FF_{mn} = F_{mn}^* + \alpha$ (13a)

when $F_{mn}^* < 0$, $FF_{mn} = F_{mn}^* - \beta$ (13b)

where both of $\alpha$ and $\beta$ are positive values, and preferably within a range of 0.3 to 0.5.

When the transformation coefficients $F_{mn}^*$ are thus modified and restored, as the Example 3 shown in FIG. 14, the SN ratio $R_{SN}$ is substantially equal to that of the Example 1 where the linear quantization is not performed and a large effect on suppressing progress of the deterioration of the image quality is attained. Further, since the transformation coefficients $F_{mn}^*$ are linearly quantized and preserved, the compressed image data $D_t$ can be reduced to achieve high data compressibility.

Although the code tables are classified into a plurality of code table groups depending on the standard deviation of the image data in the above embodiment, such classification may be performed by means of variance or various statistical value similar to the same, other than the standard deviation. That is, classification may be performed by means of some statistical value statistically representing distribution state of the image data.

Although the above embodiment has been described with reference to a method of compressing image data as to one image, the present invention may be applied to respective color separation images as to a color image. For example, respective color separation images of YMCK printed images, RGB signal images or $Y_S$-/$I_S$/$Q_S$ signal (chroma signal) images are compressed respectively. In this case, data compression suitable for each color separation image can be achieved by varying the number of threshold values of standard deviation and values thereof, the number of code table in each code tables group, the number of effective alternate current components of the code tables, and the patterns of effective bit numbers of the code tables for each color separation image.

In this case, it is preferable to determine pixel positions (i, j) ((1, 1) and (3, 3) in the above embodiment) for recording the group information in the image data $f_{ij}$ to be varied with the respective color separation images. Since values of the least significant digits of the image data $f_{ij}$ in these pixel positions are adjusted in recording of the group information, such adjustment causes a small change of the image quality. Hence the change of the image quality is reduced as a whole if the pixel position whose least significant digit values are adjusted are not overlapped in overprinting respective color separation images. Similarly, these pixel positions are preferably not adjacent to other pixel positions in the respective color separation images.

Although the group information is expressed by means of the least significant digits of the image data $f_{ij}$ of the restored image in the above embodiment, the group information may be recorded as other data separately from the image data $f_{ij}$. In this case, the image data are defined as that including not only the data $f_{ij}$ (hereinafter referred to as "image density data") representing density values of respective pixel positions but other data representing the group information.

The method of the data compression and restoration is not restricted to that of the above embodiment, but various methods such as that disclosed in Japanese Open Laying Gazette No. 109086/1980 can be applied. The present invention is applicable to a method of obtaining a statistical value substantially representing standard deviation of image data within pixel blocks and selecting one of prescribed procedures of data compression with response to the statistical value. In the embodiment, four procedures of the data compression operation using one of the code table groups different for the compression groups $g_1$ to $g_4$ correspond to the "plurality of prescribed procedures".

If the purality of prescribed procedures are not distinguished by means of the compression groups dissimilarly to the above enbodiment, some identification data for identifying the selected procedure is included in the restored image data. In this case, compressed image data are also preserved with such identification data. In the above enbodiment, the image data $f_{11}$ and $f_{33}$ in the restored image data $f_{ij}$ and the code table number Max in the compressed image data $D_t$ play the role of the identifying data, respectively.

According to the present invention, only a part of the transformation coefficients are employed to form the compressed image data, whereby the compression rate is increased without lowering the image quality.

Further, the image data are produced to include the identification data so that the same procedure as that employed in previous data compression can be applied to recompression of the restored image data, whereby progress of the deterioration of the image quality is suppressed even if the data compensation and restoration are repeated many times.

Because the identification data are expressed by means of the least significant digits of image data in prescribed pixel positions within a pixel block, there is no need to independently preserve the identification data. Consequently, the amount of restored image data is reduced while the deterioration of the image quality of the restored image is minimized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of compressing image data depicting an image with respect to a pixel block having a plurality of pixels comprising the steps of scanning said pixels in each pixel block to derive image data for each pixel block and inputting said image data to be stored and processed in an electric processing means, said method further comprising the steps of:

(a) executing an orthogonal transformation operation on said image data with respect to each pixel block, to thereby obtain a coefficient table including coefficients of a series of orthogonal functions indicative of said image data for each pixel block, (b) preparing a plurality of code tables, each of said plurality of code tables having codes arranged in a matrix, said codes indicating validation or invalidation of each coefficient in said coefficient table, to specify as valid a portion of said coefficients in said coefficient table, (c) obtaining valid coefficients of said coefficient table with respect to each code table, each said valid coefficient being validated by each code table, (d) selecting a most relevant code table most relevant to said coefficient table within said plurality of code tables on the basis of said valid coefficients by comparing with each other representative values calculated from said valid coefficients for each respective code table, and (e) collecting said valid coefficients validated by said most relevant code table, to thereby form compressed data comprising said valid coefficients for each pixel block.

2. A method in accordance with claim 1, wherein said step (d) comprises the steps of:
(d-1) computing representative values for respective code tables, each of said representative values being correlated with a sum of absolute values of said valid coefficients, and
(d-2) comparing said representative values with each other, thereby selecting said most relevant code table.

3. A method in accordance with claim 2, wherein said plurality of code tables are classified into a plurality of groups, and
said step (c) comprises the steps of:
(c-1) preparing a statistical value indicative of a standard deviation of image data for each pixel block,
(c-2) selecting one of said plurality of groups for each pixel block in response to said statistical value, and
(c-3) computing said valid coefficients only for code tables included in said selected group.

4. A method in accordance with claim 3, wherein each of said code tables included in a same group validates a same number of said coefficients.

5. A method in accordance with claim 4, wherein said coefficients of said coefficient table are expressed by means of digital data, and respective code elements in said code table further designate respective numbers of effective digits for respective valid coefficients.

6. A method of compressing image data depicting an image with respect to a pixel block having a plurality of pixels comprising the steps of scanning said pixels in each pixel block to derive image data for each pixel block and inputting said image data to be stored and processed in an electric processing means, said method further comprising the steps of:
(a) obtaining a statistic value indicative of a standard deviation of said image data on respective pixels within each pixel block,
(b) selecting one of prescribed procedures of data compression in response to said statistic value,
(c) executing data compression on said image data according to a selector procedure to thereby obtain first compressed data representing said image,
(d) storing said first compressed data with identification data specifying said selected procedure,
(e) executing data restoration on said first compressed data, to thereby obtain restored image data depicting said image and including said identification data therein,
(f) identifying said selected procedure by means of said identification data included in said restored image data, and
(g) executing data compression on said restored image data according to said selected procedure identified in said step (f), to thereby obtain second compressed data representing said image.

7. A method in accordance with claim 6, wherein said restored image data includes a plurality of components each of which is formed as digital data and, said identification data is expressed by a least significant digit of a component of said restored data, said component representing a part of said image at a prescribed position in one pixel block.

8. A method in accordance with claim 7, wherein each of said prescribed procedures comprises the steps of:
(a) executing an orthogonal transformation operation on said image data with respect to each pixel block, to thereby obtain a coefficient table including coefficients of a series of orthogonal functions indicative of said image data for each pixel block,
(b) preparing a plurality of code tables peculiar to each of said prescribed procedures, each of said plurality of code tables having codes arranged in a matrix, said codes indicating validation or invalidation or each coefficient in said coefficient table, to specify as valid a portion of said coefficients in said coefficient table,
(c) obtaining valid coefficients of said coefficient table with respect to each code table, each said valid coefficient being validated by each code table,
(d) selecting a most relevant code table most relevant to said coefficient table within said plurality of code tables on the basis of said valid coefficients by comparing with each other representative values calculated from said valid coefficients for each respective code table, and
(e) collecting said valid coefficient validated by said most relevant code table, to thereby form compressed data comprising said valid coefficients for each pixel block.

9. A method in accordance with claim 8, wherein said step (4) comprises the steps of:
(4-a) computing representative values for respective code tables, each of said representative values being correlated with a sum of absolute values of said valid coefficients, and
(4-b) comparing said representative values with each other, thereby selecting said most relevant code table.

10. A method in accordance with claim 9, wherein each of said plurality of code tables for a same procedure validates a same number of said coefficients.

11. A method in accordance with claim 10, wherein said coefficients of said coefficient table are expressed by means of digital data, and respective code elements in said code table further designate respective numbers of effective digits for respective valid coefficients.

12. An apparatus for compressing image data depicting an image with respect to each pixel block including a plurality of pixels, said apparatus comprising:
(a) means for executing an orthogonal transformation operation on said image data with each pixel block, to thereby obtain a coefficient table including coefficients of a series of orthogonal functions indicative of said image data for each pixel block,
(b) an electrical memory for storing a plurality of code tables prepared in advance, each of said plurality of code tables having codes arranged in a matrix, said codes indicating validation or invalidation of each coefficient in said coefficient table to specify as valid a portion of said coefficients in said coefficient table validated,
(c) means for obtaining valid coefficients of said coefficient table with respect to each code table, each said valid coefficient being validated by each code table, (d) means for selecting a most relevant code table most relevant to said coefficient table within said plurality of code tables on the basis of said valid coefficients by comparing with each other representative values calculated from said valid coefficients for each respective code table, and (e) means for collecting said valid coefficients validated by said relevant code table, to thereby form compressed data comprising said valid coefficients for each pixel block.

13. An apparatus in accordance with claim 12, wherein said means (d) comprises:

(d-1) means for computing representative values for respective code tables, each of said representative values being correlated with a sum of absolute values of said valid coefficients, and (d-2) means for comparing said representative values with each other, thereby selecting said most relevant code table.

14. An apparatus in accordance with claim 13, wherein said plurality of code tables are classified into a plurality of groups, and said means (c) comprises:

(c-1) means for preparing a statistical value indicative of a standard deviation of image data for each pixel block, (c-2) means for selecting one of said plurality of groups for each pixel block in response to said statistical value, and (c-3) means for computing said valid coefficients only for code tables included in said selected group.

15. An apparatus for compressing image data depicting an image with respect to each pixel block including a plurality of pixels, said apparatus comprising:

(a) means for obtaining a statistic value indicative of a standard deviation of said image data on respective pixels within each pixel block, (b) means for selecting one of prescribed procedures of data compression in response to said statistic value, (c) means for executing data compression on said image data according to a selected procedure, to thereby obtain first compressed data representing said image, (d) an electrical memory for storing said first compressed data with identification data specifying said selected procedure, (e) means for executing data restoration on said first compressed data, to thereby obtain restored image data depicting said image and including identification data therein, (f) means for identifying said selected procedure by means of said identification data included in said restored image data, and (g) means for executing data compression on said restored image data according to said selected procedure identified by said means (f), to thereby obtain second compressed data representing said image.

16. An apparatus in accordance with claim 15, wherein said identification data is expressed by a least significant digit of a component of said restored data, said component representing a part of said image at a prescribed position in one pixel block.

17. An apparatus in accordance with claim 16 wherein each of said prescribed procedures are executed by means comprising:

(a) means for executing an orthogonal transformation operation on said image data with respect to each pixel block, to thereby obtain a coefficient table including coefficients to a series of orthogonal functions indicative of said image data for each pixel block, (b) means for forming a plurality of code tables peculiar to each of said prescribed procedures, each of said plurality of code tables having codes arranged in a matrix, said codes indicating validation or invalidation of each coefficient in said coefficient table to specify as valid a portion of said coefficients of said coefficient table, (c) means for obtaining valid coefficients of said coefficient table with respect to each code table, each said valid coefficient being validated by each code table, (d) means for selecting a most relevant code table most relevant to said coefficient table within said plurality of code tables on the basis of said valid coefficients by comparing with each other representative values calculated from said valid coefficients for each respective code table, and (e) means for collecting said valid coefficients validated by said most relevant code table, to thereby form compressed data comprising said valid coefficients for each pixel block.

* * * * *